(12) United States Patent
Ingimundarson et al.

(10) Patent No.: US 7,526,563 B2
(45) Date of Patent: Apr. 28, 2009

(54) INTERWORKING GATEWAY AND METHOD

(75) Inventors: Jon Ingi Ingimundarson, Reykjavik (IS); Jean Regnier, Laval (CA); Haraldur Thorkelsson, Montreal (CA); Gaetan Vachon, Verdun (CA)

(73) Assignee: Nokia Corporation, Espoo (FI)

( * ) Notice: Subject to any disclaimer, the term of this patent is extended or adjusted under 35 U.S.C. 154(b) by 787 days.

(21) Appl. No.: 11/068,082

(22) Filed: Feb. 28, 2005

(65) Prior Publication Data

US 2005/0213537 A1 Sep. 29, 2005

Related U.S. Application Data

(60) Provisional application No. 60/547,794, filed on Feb. 27, 2004.

(51) Int. Cl.
*G06F 15/16* (2006.01)
(52) U.S. Cl. ............... 709/230; 709/245; 709/250; 370/401; 370/466; 370/467
(58) Field of Classification Search ......... 709/230–232, 709/245, 249–250; 370/401, 465–467
See application file for complete search history.

(56) References Cited

U.S. PATENT DOCUMENTS

| | | | | |
|---|---|---|---|---|
| 6,983,468 | B1 * | 1/2006 | Green et al. | 719/331 |
| 7,136,651 | B2 * | 11/2006 | Kalavade | 455/445 |
| 7,181,537 | B2 * | 2/2007 | Costa-Requena et al. | 709/230 |
| 7,359,373 | B2 * | 4/2008 | Kuusinen et al. | 370/466 |
| 7,409,428 | B1 * | 8/2008 | Brabec et al. | 709/230 |
| 2004/0148416 | A1 * | 7/2004 | Aarnos et al. | 709/230 |
| 2004/0199649 | A1 * | 10/2004 | Tarnanen et al. | 709/230 |

OTHER PUBLICATIONS

Peterson, J.: A Presence-based GEOPRIV Location Object Format. Neustar. Sep. 9, 2004.
Schulzrinne, H.: CIPID: Contact Information in Presence Information Data Format. Columbia University. Jul. 12, 2004.
Campbell, B et al.: The Message Session Relay Protocol. Airespace. Oct. 24, 2004.
Lonnfors, M et al.: User Agent Capability Extension to Presence Information Data Format (PIDF). Nokia. Oct. 24, 2004.
Schulzrinne, H.: RPID: Rich Presence Extensions to the Presence Information Data Format (PIDF). Lucent. Oct. 25, 2004.
Rosenberg, J. et al.: A Session Initiation Protocol (SIP) Event Package for Conference State. Columbia University. Oct. 25, 2004.

(Continued)

*Primary Examiner*—Bharat N Barot

(57) ABSTRACT

An interworking gateway for interworking an OMA IMPS domain and a SIMPLE domain comprises an OMA IMPS interface for communication with the OMA IMPS domain, a SIMPLE interface for communication with the SIMPLE domain and an interworking function linking the interfaces and comprising a transaction mapping module for converting an interworking subset of OMA IMPS transactions received by the OMA IMPS interface to corresponding SIMPLE transactions and relaying the corresponding SIMPLE transactions to the SIMPLE interface for transfer to the SIMPLE domain and for mapping an interworking subset of SIMPLE transactions received by the SIMPLE interface to corresponding OMA IMPS transactions and relaying the corresponding OMA IMPS transactions to the OMA IMPS interface for transfer to the OMA IMPS domain.

21 Claims, 18 Drawing Sheets

OTHER PUBLICATIONS

Rosenberg, J.: A Framework for Conferencing with the Session Initiation Protocol. Cisco Systems. Oct. 18, 2004.

Khartabil, H. et al.: The Conference Policy Control Protocol (CPCP). Nokia. Oct. 12, 2004.

Khartabil, H.: An Extensible Markup Language (XML) Configuration Access Protocol (XCAP) Usages for Conference Policy Manipulation and Conference Policy Privelges Manipulation. Nokia. Oct. 12, 2004.

Rosenberg, J. et al.: SIP Session Initiation Protocol. AT&T. Jun. 2002.

WV-040 System Architecture Model. Open Mobile Alliance Ltd. Jan. 11, 2005.

WV-041 Features and Functions. Open Mobile Alliance Ltd. Jan. 25, 2005.

WV-050 Presence Attribute DTD and Examples. Open Mobile Alliance Ltd. Jan. 25, 2005.

WV-049 Presence Attributes. Open Mobile Alliance Ltd. Jan. 25, 2005.

WV-055 SSP—Server Protocol Static Conformance Requirement. Open Mobile Alliance. Jan. 25, 2005.

WV-053 SSP—Server-Server Protocol XML Syntax Document. Open Mobile Alliance Ltd. Jan. 25, 2005.

WV-054 SSP—Transport Binding. Open Mobile Alliance Ltd. Jan. 25, 2005.

WV-052 SSP—Server-Server Protocol Semantics Document. Open Mobile Alliance Ltd. Jan. 25, 2005.

Roach, A.B.: Session Initiation Protocol (SIP)—Specific Event Notification. dynamicsoft. Jun. 2002.

Klyne, G. et al.: Date and Time on the Internet: Timestamps. Sun Microsystems. Jul. 2002.

Campbell, B. et al.: Session Initiation Protocol (SIP) Extension for Instant Messaging. Columbia University. Dec. 2002.

Rosenberg, J.: A Presence Event Package for the Session Initiation Protocol (SIP). dynamicsoft. Aug. 2004.

Peterson, J.: Common Profile for Presence (CPP). NeuStar. Aug. 2004.

Peterson, J.: Common Profile for Instant Messaging (CPIM). NeuStar. Aug. 2004.

Klyne, G. et al.: Common Presence and Instant Messaging (CPIM): Message Format. IHTFP Consulting. Aug. 2004.

Sugano, H. et al.: Presence Information Data Format (PIDF). NeuStar. Aug. 2004.

* cited by examiner

| SIMPLE Pres Caps | SIMPLE Rich Presence Format | GEO PRIV Presence Format | CIPIP Presence Format | | | | |
|---|---|---|---|---|---|---|---|
| | IMPP Presence Format | | | | SIP Conference State Event Package | Conference Policy Format | |
| | SIP Presence Event Package | | | | | | |
| | SIP Specific Event Notification extension | | | | | CPCP | |
| IMPP Message Format | SIP | | | | | HTTP 1.1 | MSRP |
| SIP Message extension | | | | | | | |
| UDP/IP | TCP/IP | | | | | | |

FIG. 4B

| OMA IMPS 1.1 SSP |
|---|
| HTTP 1.1 |
| TCP/IP |

FIG. 4A

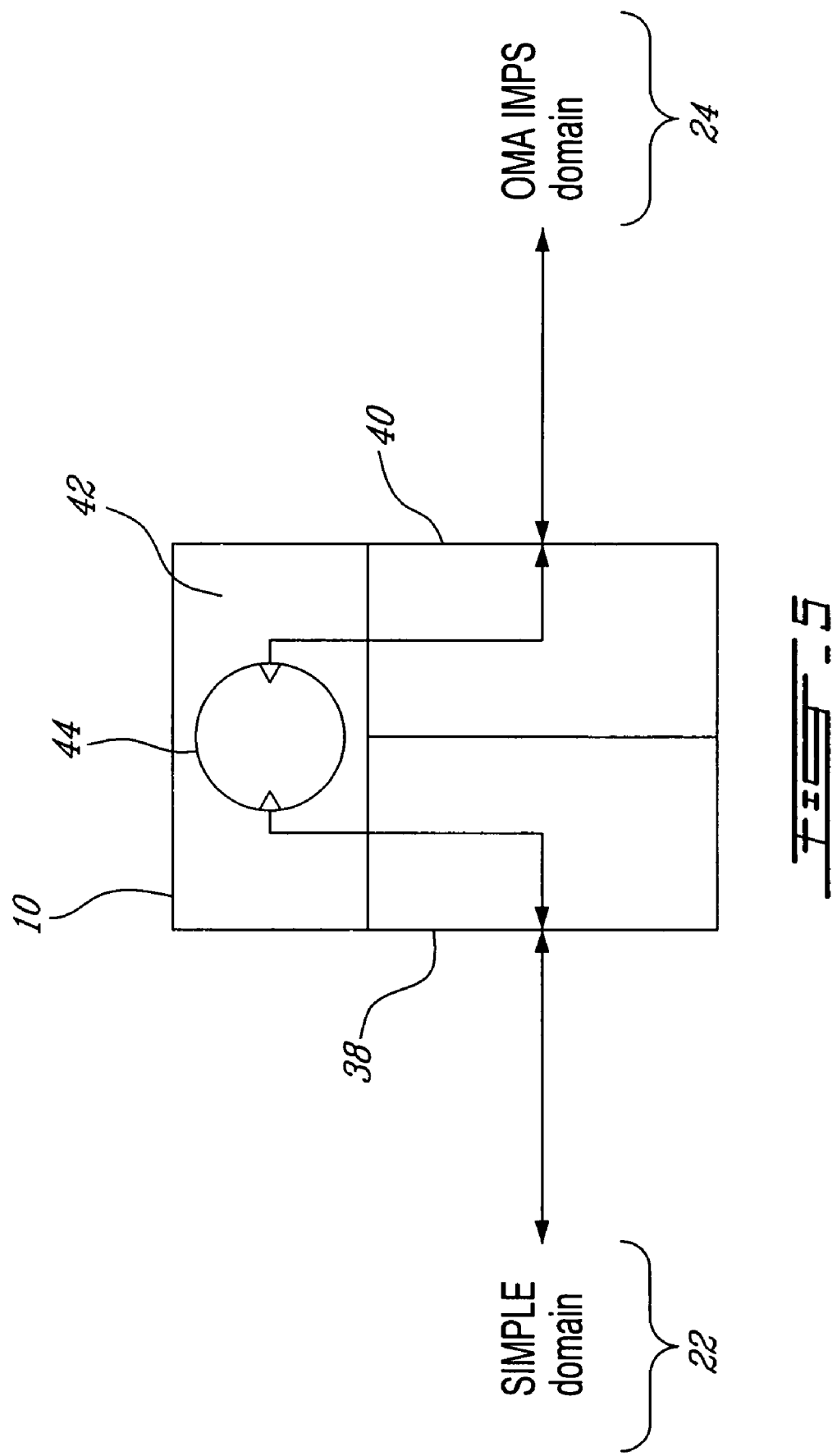

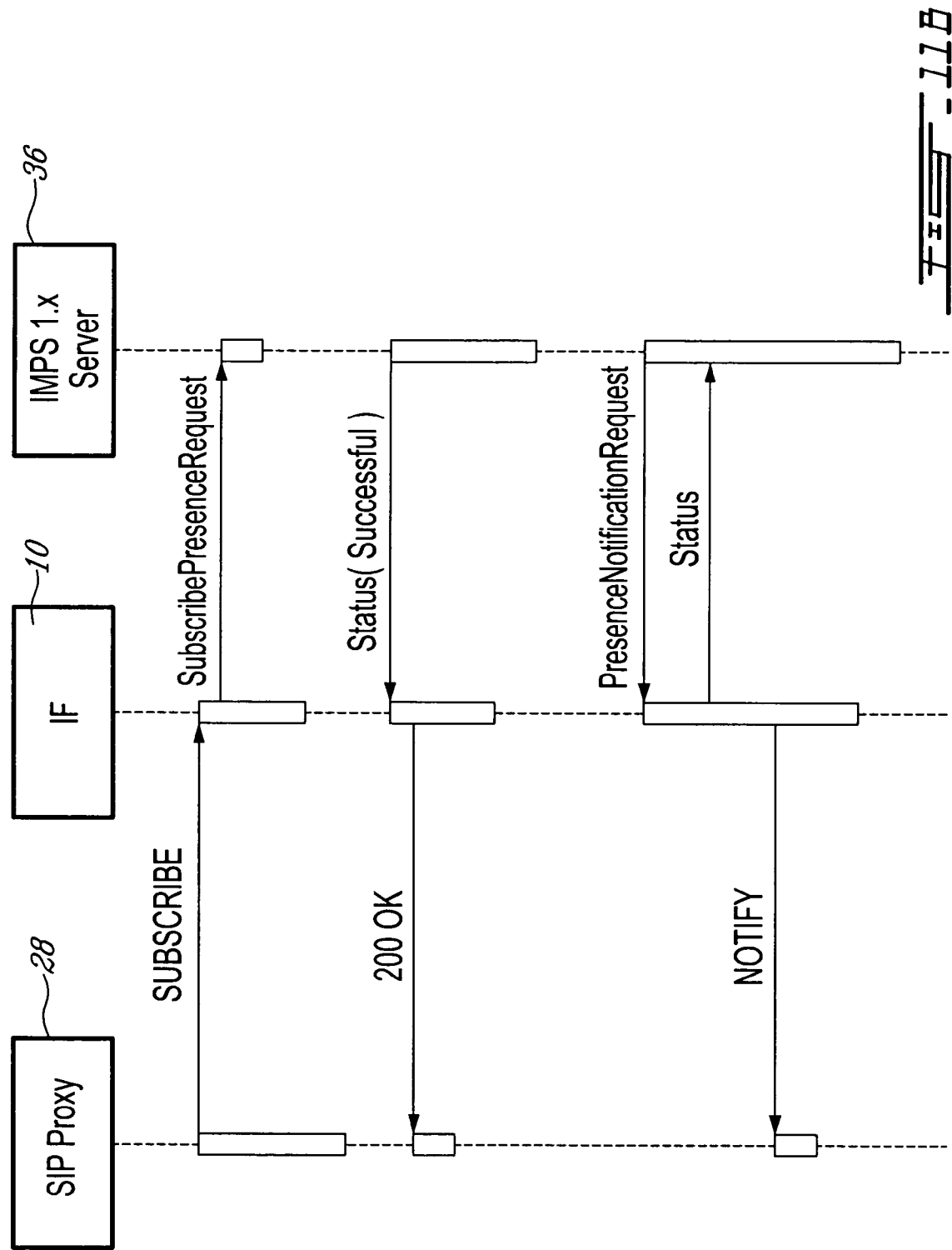

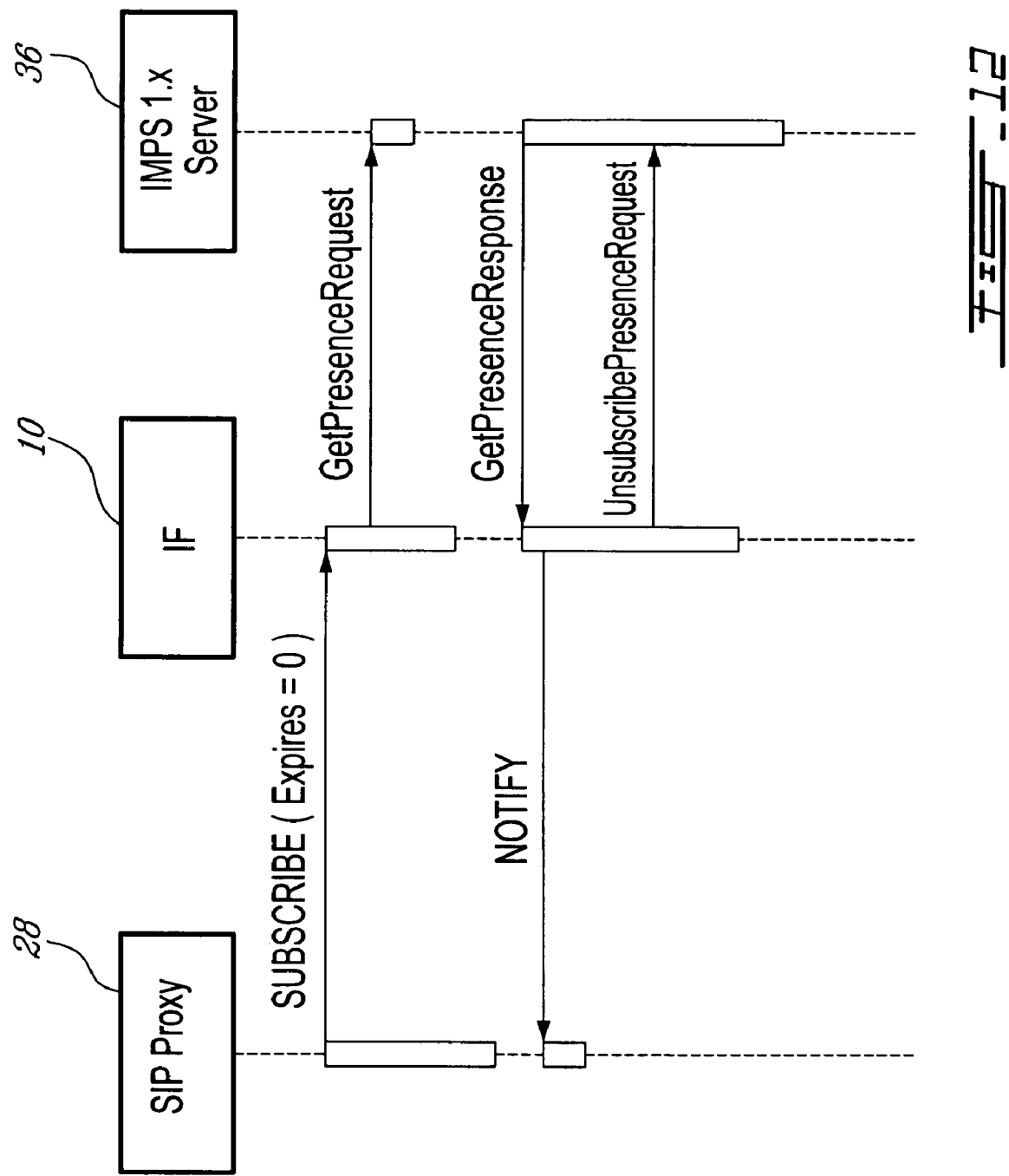

INTERWORKING GATEWAY AND METHOD

The present invention claims the benefit of a commonly assigned provisional application entitled "SIMPLE/OMA IMPS Interworking Gateway", which was filed on Feb. 27, 2004 and assigned the Ser. No. 60/547,794. The entire contents of the foregoing provisional patent application are hereby incorporated by reference.

FIELD OF THE INVENTION

The present invention relates to an interworking gateway. In particular, the present invention relates to a device and method for bridging together an Open Mobile Alliance (OMA) Instant Message and Presence Service (IMPS) infrastructure and a SIP Instant Messaging and Presence Leveraging Extensions (SIMPLE) IMPS based infrastructure.

BACKGROUND

Instant Messaging (IM) is one of the easiest and most cost effective ways of communicating interactively over a network such as the Internet. In its most basic form, IM enables users to locate and establish an independent chat session with one another. Once connected with one another, IM users can discourse textually in near real time and carry out other operations, such as the sharing of files. The nature of an IM communication is less obtrusive than a phone call and consequently IM has found its niche among other more common forms of communication. It is very well suited to immediate, informal exchanges of information among users in a distributed group. IM is integrated easily with the desktop environment (the clients usually only require limited processing power) and can be used as part of a pallet of personal or business communications.

One aspect of IM is presence, i.e. a dynamic profile of one person (user), visible to others. Presence makes available a user's status to others and the status of others is available to that user and can be used for multiple purposes, such as to control the user's own communication, to share relevant information with other users, to manage the impression a user makes on others or, for example, to control network-based services. Typical data which might be made available through presence include a user's activity (on the phone, absent, appointment, holiday, meal, meeting, in-transit, travel, vacation, busy, etc.), his location (home, office, etc.), the means that can be used to communicate with the user (chat, call, send picture, etc.) and the mood of the user (happy, sad, angry, etc.).

In addition, applications and services (for example, Push To Talk (PTT), advertising, weather service) can also publish or use presence. In a broader view, devices, places, and other things also might have a presence. In particular, presence is an indication to other users concerning a particular user's online status.

In a mobile environment, presence makes communication more effective by allowing a mobile user to see whether another party is available and what is the most suitable way to contact that person (for example, place a call, PTT the person, or send a message). Not only can individual users publish their presence, but companies and applications can use presence for advertising and as an information channel. Presence also provides a user with a degree of self-expression by enabling users to personalize how they appear on other devices. Additional services such as online games may also make use of presence information.

IM clients typically allow a user to maintain contact details of people that he/she wishes to hold IM conversations with, or whose presence the user wishes to be informed about. These contacts are known as "buddies". As a result, presence and buddy lists are closely associated. A buddy list is a list of known users whose presence is indicated. If a user is online and available to receive a message, this information will be displayed to other users who have subscribed to that user's presence information, typically using an indicative icon or the like on the user's display. By selecting the name of the user, for example using a double click of a pointing device, an IM can be sent in near real-time. Therefore, through the use of presence, a user can tell immediately which of his buddies is contactable, unlike a telephone where a party must call another party in order to see if he is contactable.

One drawback of existing IM systems is that they are proprietary in nature and interoperability between the IM products of one supplier or operator are typically unable to operate with the products of another supplier or operator. To address this problem, the OMA has developed the IMPS 1.x series of technical specifications and service frameworks which, if conformed to by a supplier in the development of their products or operator in the provision of IMPS services, ensure interoperability. The OMA IMPS 1.x series of technical specifications and service frameworks have been largely accepted and implemented by many suppliers and operators and it currently provides the sole IMPS service platform.

The emerging broadband Universal Mobile Telecommunications System (UMTS), or "third-generation (3G)," provides for the packet-based transmission of text, digitized voice, video, and multimedia at high data rates and has the objective of providing a consistent set of services to mobile computer and phone users throughout the world. SIMPLE and specifically SIP (Session Initiation Protocol) has been selected to provide the IMPS infrastructure within 3G networks. SIMPLE is not directly compatible with OMA IMPS 1.x and, as a result, when suppliers and operators start deploying SIMPLE compliant infrastructures, there will be a need for the existing OMA IMPS 1.x infrastructures to interwork with the SIMPLE infrastructures.

SUMMARY OF THE INVENTION

The present invention address the above and other drawbacks by providing an interworking gateway for interworking at least one OMA IMPS domain and a SIP infrastructure comprising at least one SIMPLE domain. The gateway comprises an OMA IMPS interface for communication with the at least one OMA IMPS domain, a SIMPLE interface for communication with the SIP infrastructure and an interworking function linking the interfaces and comprising a transaction mapping module for converting an interworking subset of OMA IMPS transactions received by the OMA IMPS interface to corresponding SIMPLE transactions and relaying the corresponding SIMPLE transactions to the SIMPLE interface for transfer to the SIP infrastructure and for mapping an interworking subset of SIMPLE transactions received by the SIMPLE interface to corresponding OMA IMPS transactions and relaying the corresponding OMA IMPS transactions to the OMA IMPS interface for transfer to the at least one OMA IMPS domain.

There is also disclosed a method for interworking at least one OMA IMPS domain and a SIP infrastructure comprising at least one SIMPLE domain. The method comprises the steps of providing an OMA IMPS interface for communication with the at least one OMA IMPS domain, providing a SIMPLE interface for communication with the SIP infrastructure, converting an interworking subset of OMA IMPS transactions received by the OMA IMPS interface to corresponding SIMPLE transactions and relaying the corresponding SIMPLE transactions to the SIMPLE interface for transfer to the SIP infrastructure, and converting an interworking subset of SIMPLE transactions received by the SIMPLE interface to corresponding OMA IMPS transactions and relaying the corresponding OMA IMPS transactions to the OMA IMPS interface for transfer to the at least one OMA IMPS domain.

Other objects, advantages and features of the present invention will become more apparent upon reading of the following nonrestrictive description of illustrative embodiments thereof, given by way of example only with reference to the accompanying drawings.

REFERENCES

The following normative and informative references are referred to in the present specification and are publicly available at http://member.openmobilealliance.org:

OMA IMPS 1.2—Features and Functions—WV-021 (OMA-IMPS-WV-Features-Functions-V1_2-20050125-A)

OMA IMPS 1.2—Presence Attributes—WV-029 (OMA-IMPS-WV-PA-V1_2-20050125-A)

OMA IMPS 1.2—Presence Attributes DTD and Examples—WV-030 (OMA-IMPS-WV-PA-DTD-V1_2-20050125-A)

OMA IMPS 1.2—Server to Server Protocol Semantics Document—WV-032 (OMA-IMPS-WV-SSP-V1_2-20050125-A)

OMA IMPS 1.2—Server-Server Protocol XML Syntax Document—WV-033 (OMA-IMPS-WV-SSP-Syntax-V1_2-20050125-A)

OMA IMPS 1.2—SSP Transport Binding—WV-034 (OMA-IMPS-WV-SSP-Transport-V1_2-20050125-A)

OMA IMPS 1.2—Server to Server Protocol Static Conformance Requirement—WV-035 (OMA-IMPS-WV-SSP-SCR-V1_2-20050125-A)

OMA IMPS 1.2—System Architecture Model—WV-040 (OMA-IMPS-WV-Arch-V1_2-20050125-A)

The following normative and informative references are referred to in the present specification and are publicly available at www.ietf.org:

SIP—Session Initiation Protocol—RFC-3261

Session Initiation Protocol (SIP)—Specific Event Notification—RFC-3265

Date and Time on the Internet: Timestamps—RFC-3339

Session Initiation Protocol (SIP) Extension for Instant Messaging—RFC-3428

A Presence Event Package for the Session Initiation Protocol (SIP)—RFC-3856

Common Presence and Instant Messaging: Message Format—RFC-3862

Presence Information Data Format (PIDF)—RFC-3863

Common Profile for Presence (CPP)—RFC-3859

Common Profile for Instant Messaging (CPIM)—RFC-3860

RPID—Rich Presence Information Data Format—draft-ietf-simple-rpid-04

CIPID: Contact Information in Presence Information Data Format—draft-ietf-simple-cipid-03

The Message Session Relay Protocol—draft-ietf-simple-message-sessions-09

A Framework for Conferencing with the Session Initiation Protocol—draft-ietf-sipping-conferencing-framework-03

A Session Initiation Protocol (SIP) Event Package for Conference State—draft-ief-sipping-conference-package-06

Conference Policy Control Protocol for Centralized Conferencing—draft-ietf-xcon-cpcp-01

An Extensible Markup Language (XML) Configuration Access Protocol (XCAP) Usage for Conference Policy Manipulation and Conference Policy Privileges Manipulation—draft-ietf-xcon-xcap-cpcp03

User agent capability presence status extension—draft-ieff-simple-prescaps-ext-02

A Presence-based GEOPRIV Location Object Format—draft-ietf-geopriv-pidf-lo-03

BRIEF DESCRIPTION OF THE DRAWINGS

FIG. 4A is a diagram of the OMA IMPS protocol stack in the interworking gateway in accordance with an illustrative embodiment of the present invention;

FIG. 4B is a diagram of the SIMPLE protocol stack in the interworking gateway in accordance with an illustrative embodiment of the present invention;

FIG. 5 is a block diagram of the OMA IMPS protocol stack, SIMPLE protocol stack and transaction mapping module in accordance with an illustrative embodiment of the present invention;

FIGS. 11A and 11B provide diagrams of the transactions for subscribing between an OMA IMPS and SIMPLE domains in accordance with an illustrative embodiment of the present invention;

FIG. 12 provides a diagram of the transactions for unsubscribing between SIMPLE and OMA IMPS domains in accordance with an illustrative embodiment of the present invention;

DETAILED DESCRIPTION OF THE ILLUSTRATIVE EMBODIMENTS

Figure 1:
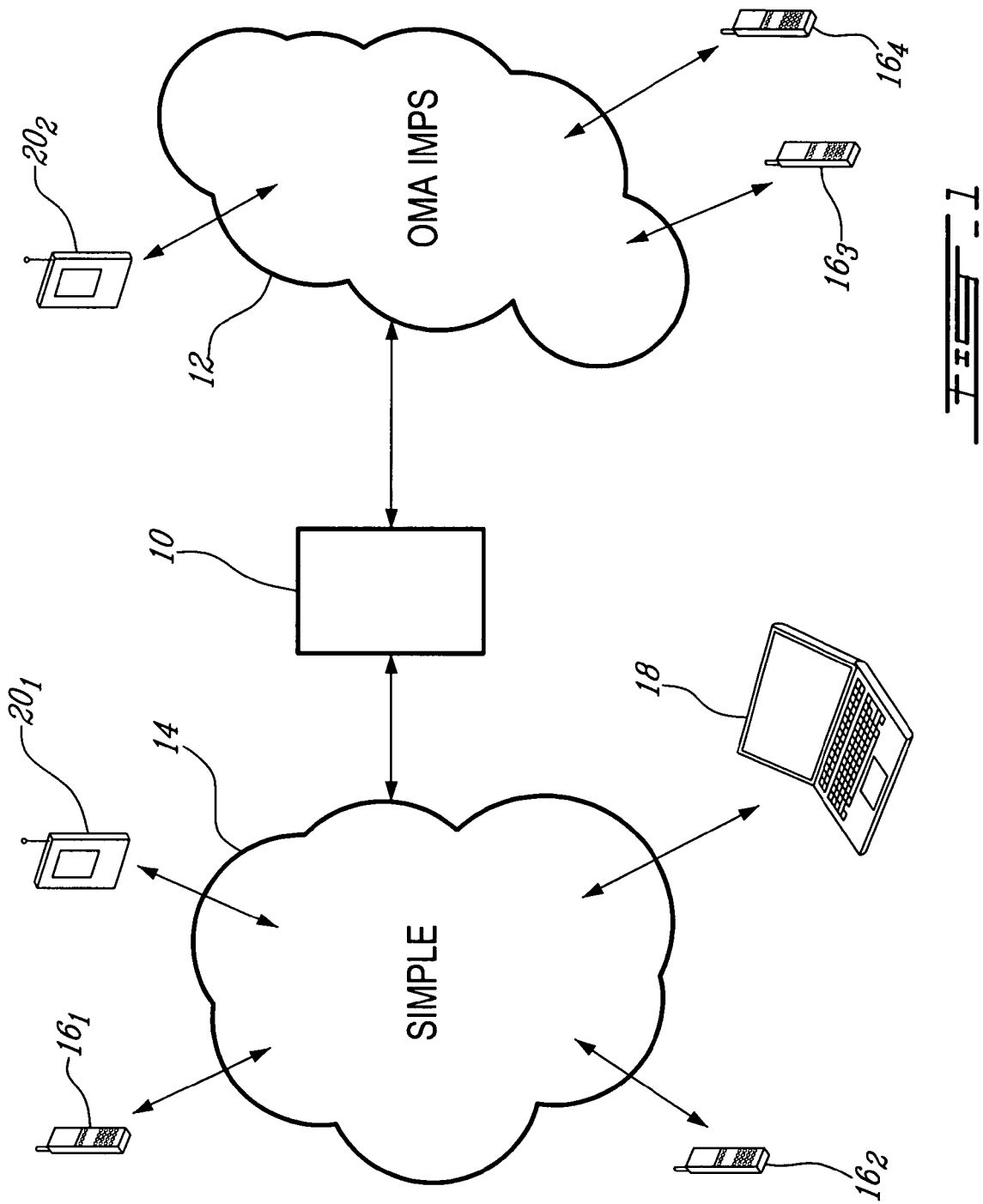
FIG. 1 is a schematic diagram of an interworking gateway interposed between an OMA IMPS domain and a SIMPLE domain in accordance with an illustrative embodiment of the present invention.

Referring now to FIG. 1, an interworking gateway, generally referred to using the reference numeral 10, in accordance with an illustrative embodiment of the present invention will now be described. The interworking gateway 10 interconnects a first OMA IMPS 1.x infrastructure (or domain) 12 with a SIMPLE infrastructure (or domain) 14. In this regard, Of course, as will be apparent to a person of ordinary skill in the art, in an actual implementation a plurality of interworking gateways 10 would typically be provided between the OMA IMPS 1.x and SIMPLE infrastructures (or domains) 12, 14. In particular, and as will be seen below, the interworking gateway 10 provides a path and those translation functions necessary to allow participants (clients) in a first IMPS domain such as an OMA IMPS domain to communicate with clients in a second different IMPS domain such as a SIMPLE (IMPS) domain.

Still referring to FIG. 1, through the use of clients installed in mobile phone handsets 16, web browsers 18, PDAs 20, and the like, users access their respective IMPS infrastructures for the exchange of instant messages and presence with other users in both their respective domains and in other domains via the interworking gateway 10. In order to support the communication of instant messages and presence between the OMA IMPS 1.x infrastructure 12 and the SIMPLE infrastructure 14 and vice versa, the interworking gateway 10 is able to support the following actions:

Send Message/Message Delivery: A user in a first IMPS domain (User A) sends a multimedia message (MIME encoded) to a user in a different IMPS domain (User B). The message is delivered to User B. User B is able to reply to the message.

Subscribe to Presence: A user in a first IMPS domain (User A) subscribes to the value of a user in a different IMPS domain's (User B) presence (or presence state). As will be seen below, presence can consist of different attributes, such as online status or location. At a later time User A can unsubscribe to the value of User B presence state.

Poll for Presence: An enhancement to 'Subscribe to Presence'. User's in either IMPS domain can retrieve the current presence state of the other user without the necessity setting up subscription state.

Presence Notification: When the presence (or subset of presence) for a particular user is updated, a notification is sent to all users that have subscribed to the state and have been authorized to receive the change in the presence.

Group Communication: An enhancement to 'Send Message/Message Delivery'. Users in different IMPS domains can communicate with each other within the context of a Communication Group (or conference). Other users in either IMPS domain may also join the conference.

Group Policy Management: Each Communication Group has an associated group policy (or group attributes). This policy may be retrieved or manipulated by a user in either IMPS domain depending on the group policy (access rights).

High Level Architecture

Figure 2:
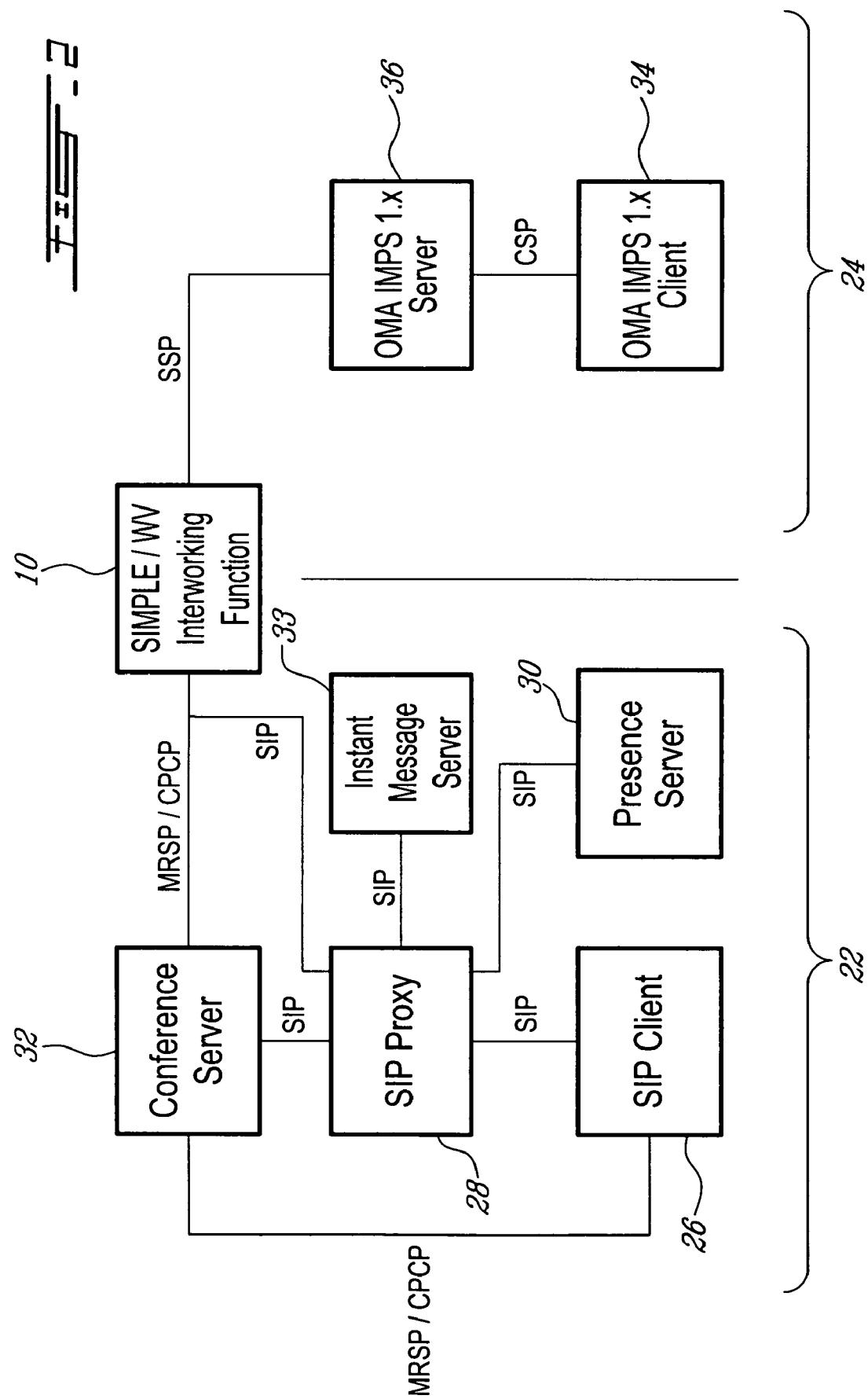
FIG. 2 is a functional block diagram of an interworking gateway interposed between an OMA IMPS domain and a SIMPLE domain in accordance with an illustrative embodiment of the present invention.

FIG. 2 shows an overview of the high level architecture of an interworking gateway 10 operating between an OMA IMPS domain 24 and a SIMPLE domain 22. In the SIMPLE domain 22, a SIP client 26 (typically implemented on a host device such as a mobile telephone, PDA or the like) communicates with a SIP proxy 28, and a presence server 30, a conference server 32 and an instant messaging server 33 via the SIP proxy 28. In this regard, the conference server 32 is a logical instance of the logical entities defined in the Message Session Relay Protocol draft-ietf-simple-message-sessions-09 and a Framework for Conferencing with the Session Initiation Protocol, draft-ietf-sipping-conferencing-framework-03, both of which are incorporated herein by reference, and provides the necessary functions to provide Message Sending Relay Protocol (MSRP) relay, conference policy server, conference notification server and conference focus.

SIP is a peer-to-peer protocol which works in concert with several other protocols and is involved in the signaling portion of a communication session. For example, MSRP is used to transmit session based messages such as text and files between end users. MSRP uses a single primitive, the SEND primitive, for sending instant messages between end points. In order to initiate an instant messaging session, a client sends a SIP INVITE request to a peer. The MSRP session is terminated using a SIP Bye message. CPCP is used to manipulate a conference policy when communicating within the context of a group.

In a typical implementation, in a given SIMPLE domain as in 22 there would be a large number of SIP clients as in 26 and a much smaller number of simple proxies as in 28, presence servers as in 30, conference servers as in 32, and Instant Messaging servers as in 33. Similarly, in the OMA IMPS domain 24, an OMA IMPS client 34 (typically implemented on a host device such as a mobile telephone, PDA or the like) communicates with an OMA IMPS server 36. Similar to the SIMPLE domain 22, in an OMA IMPS domain 24 there would typically be a large number of OMA IMPS clients as in 34 and a much smaller number of OMA IMPS servers as in 36.

Still referring to FIG. 2, the interworking gateway 10 communicates with the SIMPLE domain 22 using the MSRP, CPCP and SIP protocols with extensions as required and with the OMA IMPS domain 24 using the OMA IMPS 1.x Server-to-Server Minimum Interoperability Protocol (SSP).

Figure 3:
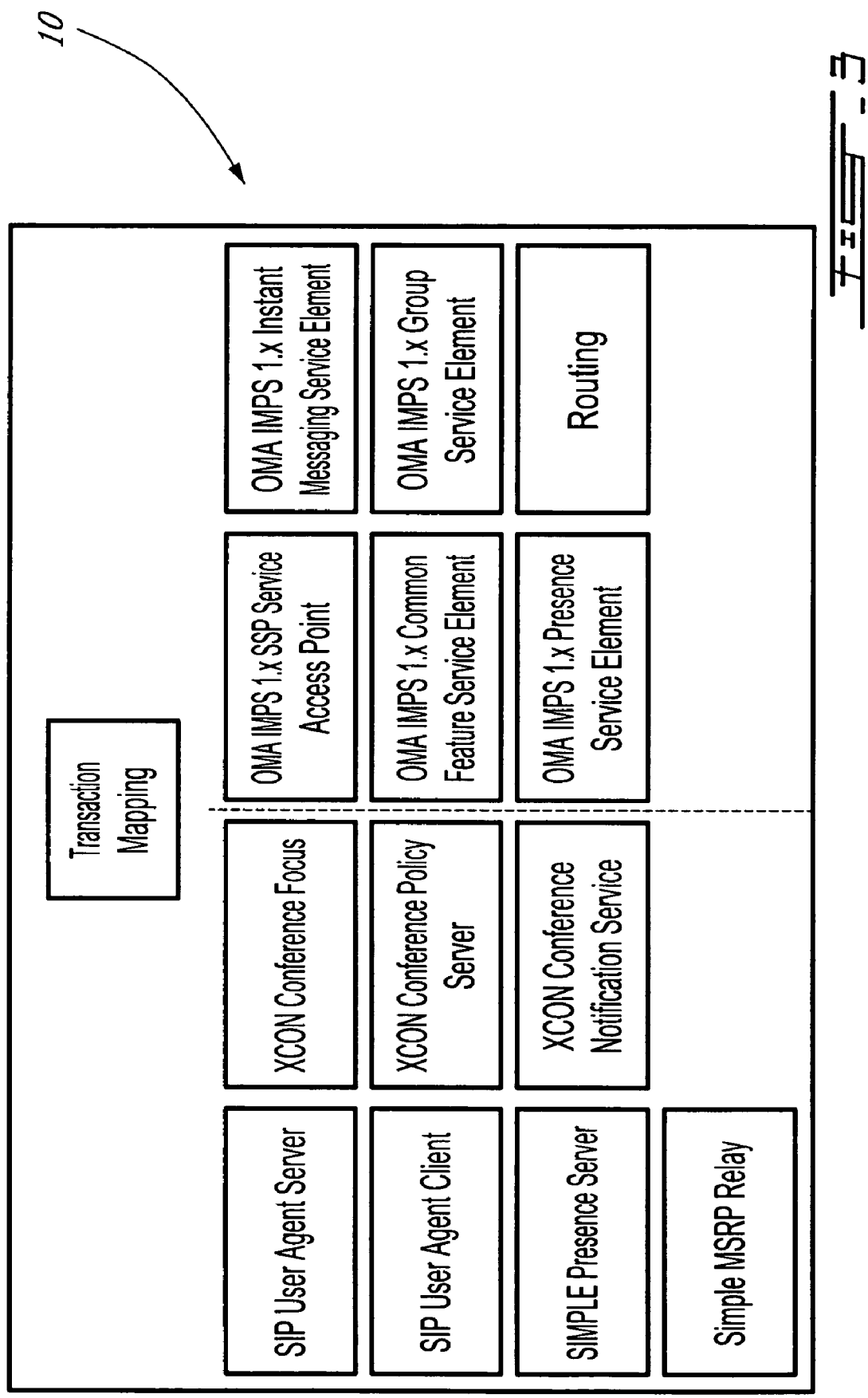
FIG. 3 is a diagram of the logical components of an interworking gateway in accordance with an illustrative embodiment of the present invention.

The IMPS services of a user/client are typically provided by servers in his/her home IMPS domain. One purpose of the interworking gateway 10 is to allow these IMPS services to be applied with other end-users/clients served by an IMPS server in a different IMPS domain. Referring to FIG. 3, the logical components of the interworking gateway 10 are provided.

FIG. 4A provides a diagram of the protocol layers on the OMA IMPS side of the interworking gateway 10. Similarly, FIG. 4B provides a diagram of the protocol layers on the SIMPLE side of the interworking gateway 10.

Roaming

Providing for roaming allows for users using IMPS clients on either OMA IMPS or SIMPLE to access their IMPS services while in the coverage of another network, notwithstanding that that network may utilize an IMPS infrastructure based on a different IMPS technology. Roaming can be accomplished in a number of ways. For example, clients implementing SIMPLE or OMA IMPS can use roaming between packet based networks (for example, between different GPRS or 1XRTT networks) to connect directly to their home network. Clients implementing OMA IMPS will additionally require that Short Message Service (SMS) roaming be in place if the client implements SMS technology for client/server communications. This means that clients can operate not only in their native IMPS domains, but also in IMPS domains implementing a different type of IMPS.

Transaction Mapping

Referring now to FIG. 5, in order to provide for the transfer of instant messages and presence between SIMPLE and OMA IMPS domains, the interworking gateway 10 comprises a SIMPLE interface 38 for communications with the SIMPLE domain(s) 22 and an OMA IMPS interface 40 for communication with the OMA IMPS domain(s) 24. Additionally, the gateway 10 comprises an interworking function 42 which links the SIMPLE and OMA IMPS interfaces 38, 40. The interworking function 42 comprises a transaction mapping module 44 which maps or converts protocol (or transactions) between the OMA IMPS domain 24 and the SIMPLE domain 22 and vice versa. In this regard, it will be apparent now to a person of ordinary skill in the art that the transaction mapping module 44 need only have the requisite functionality to map an interworking subset of all possible transactions, i.e. those transactions which involve both participants in both the OMA IMPS domain 24 and the SIMPLE domain 22. Local transactions, i.e. those transactions between participants in the local domain, such as communications involving only an IMPS client and IMPS server in the local domain, need not be mapped. However, the interfaces 38, 40 must be equipped to handle local transactions. Note that in this regard, participant is understood broadly to cover any function or equipment in either the OMA IMPS or SIMPLE domains which exchange OMA IMPS or SIMPLE communications. The following tables provide an over view of the transactions which are mapped by the transaction mapping module 44 in the interworking gateway 10.

TABLE 1A

Common

| OMA IMPS | SIMPLE |
| --- | --- |
| InviteRequest | INVITE |
| InviteResponse | INVITE |
| InviteUserRequest | INVITE |
| InviteUserResponse | INVITE |
| CancelInviteRequest | CANCEL |
| CancelInviteRequest | CANCEL |

TABLE 1B

Presence

| OMA IMPS | SIMPLE |
| --- | --- |
| SubscribePresenceRequest | SUBSCRIBE |
| UnsubscribePresenceRequest | SUBSCRIBE with expires = 0 |
| PresenceNotificationRequest | NOTIFY |
| GetPresenceRequest | SUBSCRIBE with expires = 0 |
| GetPresenceResponse | SUBSCRIBE with expires = 0 |

TABLE 1C

Instant Message

| OMA IMPS | SIMPLE |
| --- | --- |
| SendMessageRequest | MESSAGE + MSRP |
| SendMessageResponse | MESSAGE + MSRP |

TABLE 1D

Group

| OMA IMPS | SIMPLE |
| --- | --- |
| DeleteGroupRequest | CPCP mechanism for destroying a conference |
| JoinGroupReq/Resp | INVITE |
| LeaveGroupReq/Resp | BYE |
| GetJoinedUsersReq/Resp | CPCP mechanism for retrieving list of users |
| GetGroupMembersReq/Resp | CPCP mechanism for retrieving list of conference members (allowed users) |
| AddGroupMembersRequest | CPCP mechanism for adding members |
| RemoveGroupMembersRequest | CPCP mechanism for removing members |
| MemberAccessRequest | CPCP mechanism for changing member access rights |
| RejectListReq/Resp | CPCP mechanism for removing user from conference |
| GetGroupPropsReq/Resp | CPCP mechanism for retrieving current conference policy. |
| SetGroupPropsRequest | CPCP mechanism for manipulating current conference policy |
| SubscribeGroupNoticeReq/Resp | SIP SUBSCRIBE |
| GroupChangeNotice | SIP NOTIFY |

Transport and Connection Requirements

The interworking gateway 10 provides for transport and connection requirements in conformance for a SIP User Agent Server and Client as defined in SIP—Session Initiation Protocol—RFC 3261. It also complies to the Static Conformance Requirements for OMA IMPS 1.x SSP for Infrastructure & Session Management Requirements as defined in OMA IMPS 1.2—Server to Server Protocol Static Conformance Requirement v1.2—WV-035 and supports the transport requirements defined in SSP Transport Binding as defined in OMA IMPS 1.2—SSP Transport Binding v1.2—WV-034, all of which are incorporated herein by reference.

In order to maintain state within a SIP dialog the interworking gateway 10 must remain in the path of all future requests within a SIP dialog. Using SIP this can be readily achieved by using the Record-Route feature. The interworking gateway 10 inserts a SIP Record-Route header to requests in front of any existing Record-Route headers in the request, as defined in SIP—Session Initiation Protocol—RFC 3261. The Record-Route header inserted by the interworking gateway 10 must contain a SIP URI identifying the host on which the running the interworking gateway 10.

Contrary to the SIMPLE domain, in the OMA IMPS domain all transactions are routed through an OMA IMPS server servicing the OMA IMPS client. In order to correctly route transactions destined for the OMA IMPS domain, the interworking gateway 10 maintains an internal routing table compliant to the SSP Interoperability Rules (as defined in OMA IMPS 1.2—Server to Server Protocol Semantics Document—WV-032 which is incorporated herein by reference). In this regard, the routing table in the interworking gateway

10 contains the addresses of OMA IMPS clients cross referenced to the OMA IMPS servers which are used to reach these OMA IMPS clients.

Routing and Addressing

The interworking gateway transparently maps between one address scheme to another. As a result, users belonging to the SIMPLE domain are able to address users belonging to the OMA IMPS domain using a normal SIP Uniform Resource Identifier (URI), and vice-versa. In the SIMPLE domain SIP addresses are used for identifying both end-users and services. SIP addresses are based on the guidelines defined in RFC 2396 (which is incorporated herein by reference) using a form similar to the mailto URL.

In the OMA IMPS domain a format based on RFC 2396 is also used. As a result, the interworking gateway 10 does not need to perform special mapping between the two address formats, except to handle the specific schemas used, provided the operator of the OMA IMPS domain or the SIMPLE domain limits the provisionable user-ids to the character range allowed in both specifications. An exception to this is if the address used in the OMA IMPS domain contains the following characters that are reserved in the user part of a SIP scheme: ";"/"?"/":"/"&"/"="/"$"/",". These characters are escaped when used within a SIP URI.

One of two solutions is available for selecting the home location of a particular user-id:

Same Domains: a mechanism is needed to provide routing per user-id towards the interworking gateway 10. In the SIMPLE domain the SIMPLE participants relay communications with addresses belonging to OMA IMPS domain users to the interworking gateway 10 which generates legal OMA IMPS domain addresses for transfer through the OMA IMPS domain. In the OMA IMPS domain the OMA IMPS participants relay communications with addresses belonging to SIMPLE domain users to the interworking gateway 10 which generates legal SIMPLE domain addresses for transfer through the SIMPLE domain, taking into consideration necessary escaping of reserved characters.

Separate Domains: a protocol specific part is added to the domain which is used as a rule for performing routing towards the interworking gateway 10.

Per user-id routing is already widely used for handling e-mail. Similarly, routing between the OMA IMPS and SIMPLE domains could be based on the same type of solution, for example using an Lightweight Directory Access Protocol (LDAP) based directory lookup.

Instant Messaging

The interworking gateway 10 complies to the requirements for a SIP User Agent Server and Client as defined in SIP—Session Initiation Protocol—RFC 3261 and the Session Initiation Protocol (SIP) Extension for Instant Messaging as defined in Session Initiation Protocol (SIP) Extension for Instant Messaging—RFC-3428 which is incorporated herein by reference. It also complies to the Static Conformance Requirements for OMA IMPS 1.x SSP Instant Messaging Service Element as defined in OMA IMPS 1.2—Server to Server Protocol Static Conformance Requirement—WV-035.

As both OMA IMPS 1.x and SIMPLE have selected the e-mail type MIME content there is no need to define a message translation functionality into the interworking gateway 10.

Both SIMPLE and OMA IMPS 1.x define two different messaging models (or modes):

Page—single independent messages are sent between entities. Use of this model for instant messaging is preferred as only a small number of messages are being sent and routing might have to be performed on a per message basis.

Session-mode—a persistent route is established between entities. This route may also be over different paths than the control signaling (the session mode will be described in more detail in the context of invitations and group communications as discussed hereinbelow).

Page Mode Messaging

In page mode messaging, the Instant Message is transferred during signaling using a SendMessageRequest in the OMA IMPS domain and a MESSAGE in the SIMPLE domain. OMA IMPS 1.x additionally defines the concept of a delivery report. There is no similar concept defined in SIMPLE. Therefore, the interworking gateway 10, upon receipt of a request from a participant in the OMA IMPS domain containing a delivery report, requests that state be maintained and generates a delivery report for transfer to the OMA IMPS participant upon reception of a final response from the SIMPLE domain.

Each SendMessageRequest in the OMA IMPS domain destined for a participant in the SIMPLE domain is mapped to a MESSAGE. The SIMPLE status response is mapped to the OMA IMPS Status. Similarly, each MESSAGE in the SIMPLE domain destined for a participant in the OMA IMPS domain is mapped to a SendMessageRequest. The OMA IMPS Status is mapped to a SIMPLE status response.

The format of the headers containing dates or time are transformed to comply to the relevant specifications on either side, which are described in Date and Time on The Internet: Timestamps—RFC-3339 and OMA IMPS 1.2—Server-to-Server Protocol XML Syntax Document v1.2—WV-033, both of which are incorporated herein by reference. The format of headers containing addresses is transformed to comply to the relevant specifications in either the OMA IMPS domain or the SIMPLE domain, as described in SIP—Session Initiation Protocol—RFC-3261, OMA IMPS 1.2—Server-to-Server Protocol XML Syntax Document v1.2—WV-033 and OMA IMPS 1.2—Server to Server Protocol Semantics Document v1.2—WV-032. The SIMPLE Call-ID header is mapped into an OMA IMPS MessageID header and vice-versa maintaining the requirements on either side for uniqueness.

The interworking gateway 10 supports the minimum interoperability content type defined by the SIMPLE and OMA IMPS 1.x specifications as described in Session Initiation Protocol (SIP) Extension for Instant Messaging as defined in Session Initiation Protocol (SIP) Extension for Instant Messaging—RFC-3428 and OMA IMPS 1.2-Server to Server Protocol Semantics Document v1.2—WV-032. Both these standards allow clients to use other types of content types and/or specific content encoding. However note that interoperability is not guaranteed since receiving clients may not support the content type.

For multiparty chat SIMPLE places the requirement on the interworking gateway 10 that it encapsulate the main content type in a 'message/cpim' content type envelope (see Common Presence and Instant Messaging (CPIM)—RFC-3862 which is incorporated herein by reference). This is necessary as the SIMPLE MSRP protocol does not support addressing of multipart recipients. It is therefore necessary to utilize the 'message/cpim' content type for this purpose.

EXAMPLE 1

Figure 6A:
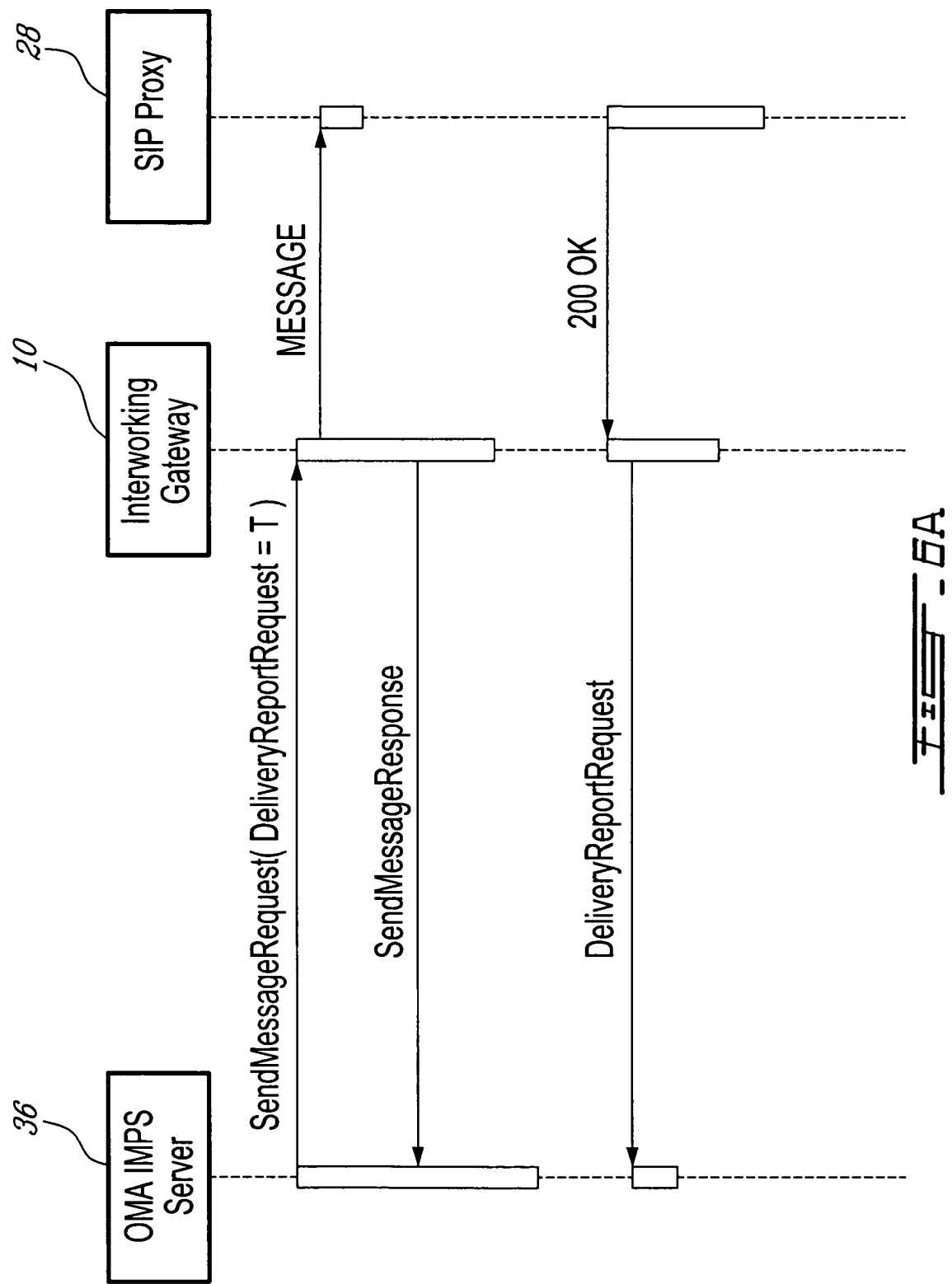
FIGS. 6A and 6B provide diagrams of the transactions for sending messages between an OMA IMPS and SIMPLE domains in accordance with an illustrative embodiment of the present invention.
Figure 6B:
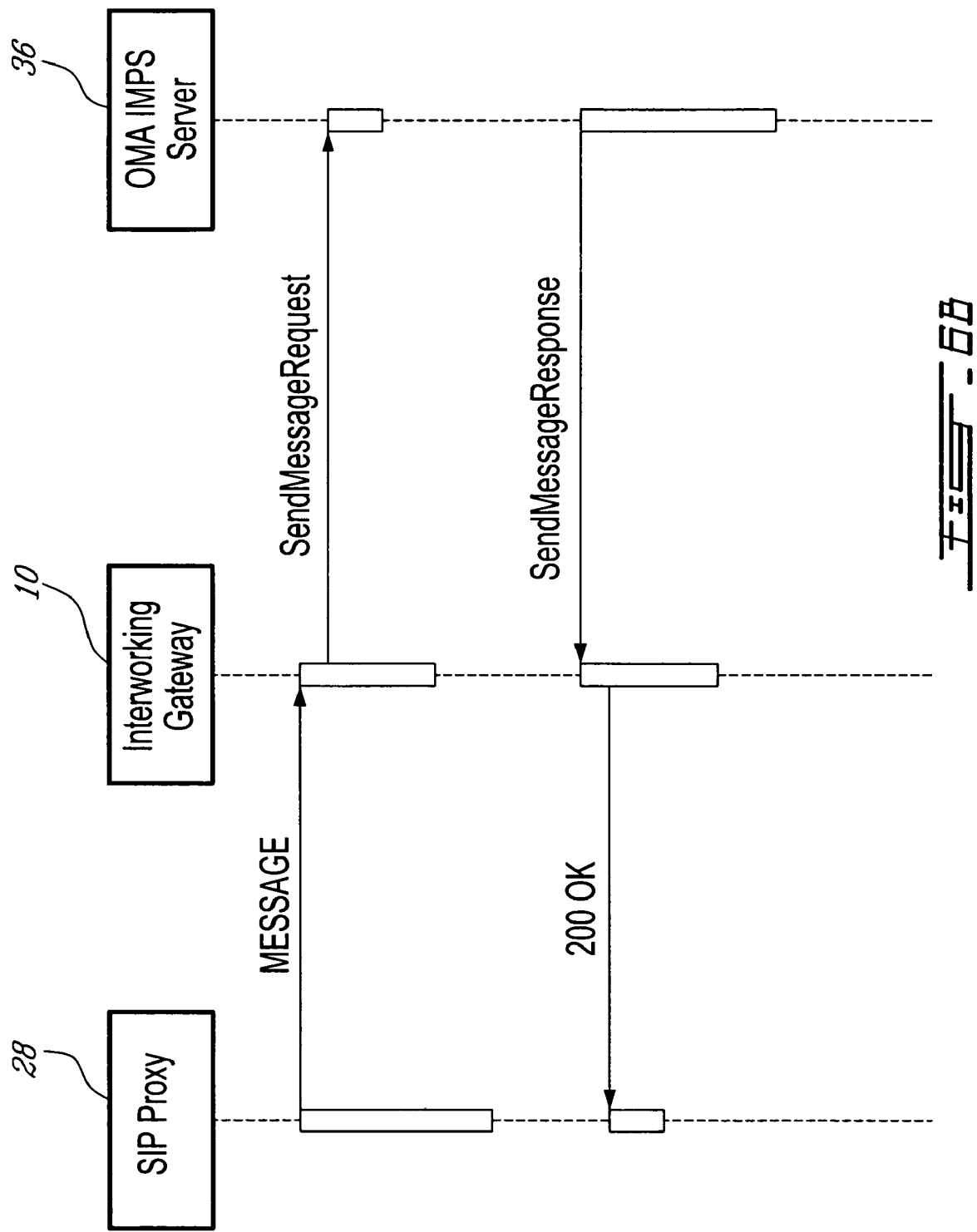

Referring now to FIG. 6A, a Sequence Diagram in Uniform Modelling Language (UML) Notation for an example message flow of an instant message sent from a participant in an OMA IMPS domain via an OMA IMPS server 36 to a participant in a SIMPLE domain via a SIP proxy 28 is shown. On reception of a SendMessageRequest, the interworking gateway 10 generates a SIP MESSAGE request and sends it to the SIP proxy 28 servicing the recipient. As the sender has requested a delivery report (which is a feature not available in a SIMPLE domain), the interworking gateway 10 generates one when it receives a SIP final response from the SIP proxy 28. A Sequence Diagram for the reverse direction is shown in FIG. 6B. The interworking gateway 10 receives a MESSAGE request from the SIP proxy 28 and generates a SendMessageRequest for transfer to the OMA IMPS server 36. Upon reception of a SendMessageResponse from the OMA IMPS server 36, the interworking gateway 10 generates a 200 OK for transfer to the to the SIP proxy 28.

Invitations

The interworking gateway 10 complies to the requirements for a SIP User Agent Server and Client as defined in as described in SIP—Session Initiation Protocol—RFC-3261. It also complies to the Static Conformance Requirements for the Invitation related transactions of the OMA IMPS 1.2 SSP Common Service Element as defined in OMA IMPS 1.2—Server to Server Protocol Static Conformance Requirement v1.2—WV-035.

Transactions used in the OMA IMPS domain and SIMPLE domain for inviting remote entities to a session contain very similar semantics. A primary difference is that invitations in the in OMA IMPS domain are stateless, and as a result there is no need to explicitly tear down the session. This introduces complications for the interworking gateway 10 as without using a group there is no way for the interworking gateway 10 to be aware of when an OMA IMPS client has decided to stop a session-mode conversation that was setup. The interworking gateway 10 therefore maintains state and a "keep alive" timer for the session-mode conversation. If no messages have been received from the OMA IMPS side before the keep alive timer expires, the interworking gateway 10 closes the SIMPLE based session by sending a BYE to the associated SIP proxy.

Figure 7:
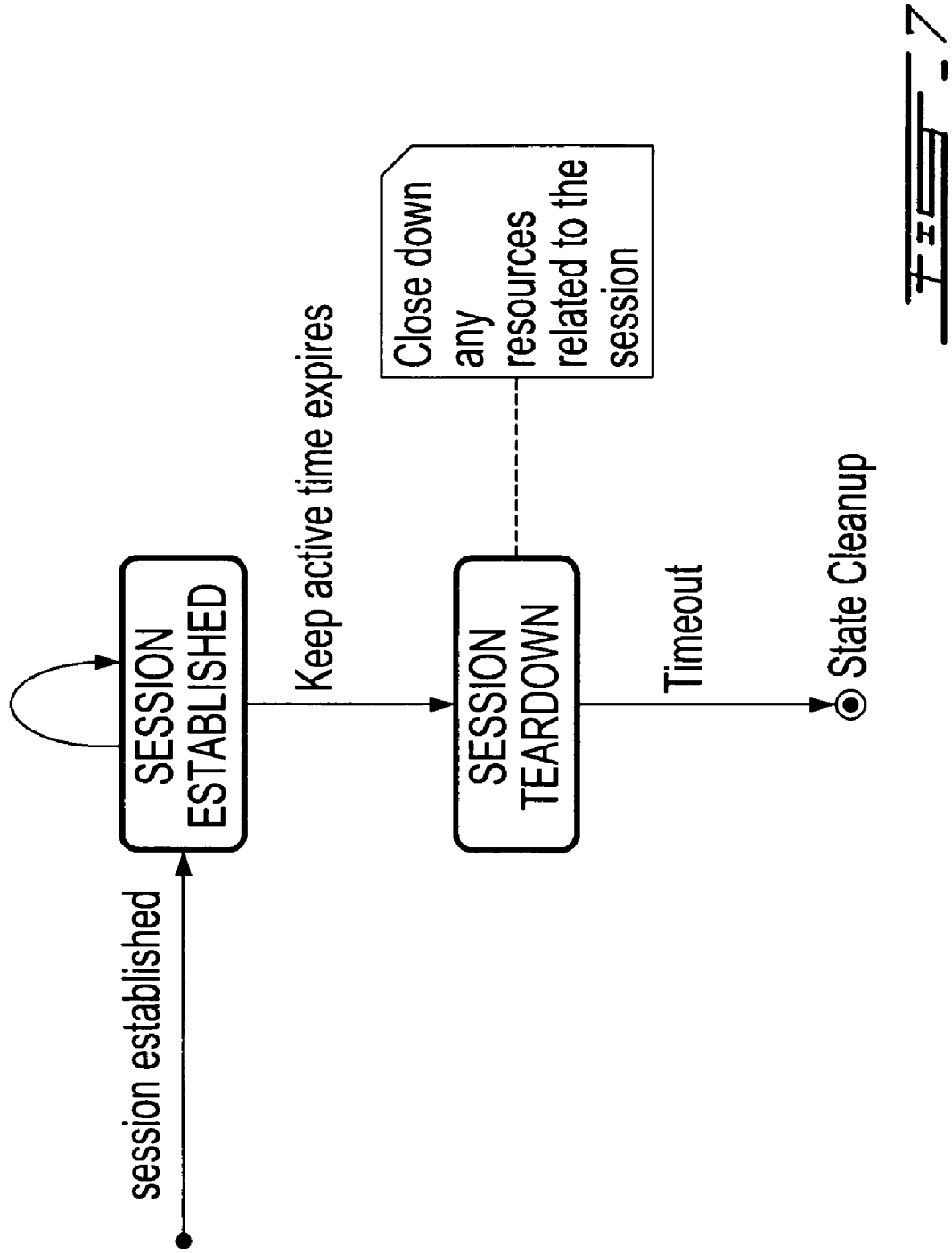
FIG. 7 is a state transition diagram for session establishment and tear down in accordance with an illustrative embodiment of the present invention.

Referring now to FIG. 7, a State Transition Diagram in UML Notation illustrating a session establishment and tear down is provided. Session establishment occurs immediately after an InviteUserResponse or transmission of successful response (200 OK) to an INVITE transaction. Particular sessions can be identified using OMA IMPS InviteID or SIMPLE Call-ID.

If an OMA IMPS group (or focus in SIMPLE terminology) provides the centre for the communications, the interworking gateway 10 can tear down the SIMPLE session when the OMA IMPS user leaves the group.

In transferring invitations from the OMA IMPS domain to the SIMPLE domain, the interworking gateway 10 carries out the following mappings:

OMA IMPS InviteRequests are mapped to SIMPLE INVITEs.

SIMPLE Status responses are mapped to OMA IMPS InviteResponses.

OMA IMPS CancelRequests are mapped to SIMPLE CANCELs

SIMPLE CANCELs are mapped to OMA IMPS Status.

In transferring invitations from the SIMPLE domain to the OMA IMPS domain, the interworking gateway 10 carries out the following mappings:

SIMPLE INVITEs are mapped to OMA IMPS InviteUserRequests.

OMA IMPS InviteUserResponses are mapped to SIMPLE Status responses.

SIMPLE CANCELs are mapped to OMA IMPS CancelRequests.

Status of OMA IMPS CancelRequests are mapped to SIMPLE Status responses.

Additionally, the interworking gateway 10 provides for the handling of SIMPLE ACKs.

The interworking gateway also provides for translation of OMA IMPS Invitation-ID headers to SIMPLE Call-ID headers and the translation of OMA IMPS Invitation-Type headers into a SIP Session Description Protocol (SDP) description detailing the type of session that the end-user wishes to establish.

Invitations can be to different OMA IMPS types or SIMPLE sessions, in particular the following types:

Session-mode messaging, defined as invitation-type: Messaging in OMA IMPS and session-mode messaging in SIMPLE.

Group communication, defined as invitation-type: Group in OMA IMPS and conferencing in SIMPLE.

When receiving a SDP description from the SIMPLE domain the interworking gateway 10 generates the correct headers for use in the corresponding OMA IMPS transactions. The same applies in the other direction, except that the interworking gateway 10 generates a SDP body based on the headers received from the OMA IMPS domain. The interworking gateway 10 also handles other types of SDP content by generating a SIP error message. Note that the interworking gateway 10 may handle other OMA IMPS invitation types by using an implementation specific method, for example by generating a Page message detailing an end-user wish to share presence or content when a presence invitation type is received by the interworking gateway 10 from the OMA IMPS domain.

EXAMPLE 2

Figure 8A:
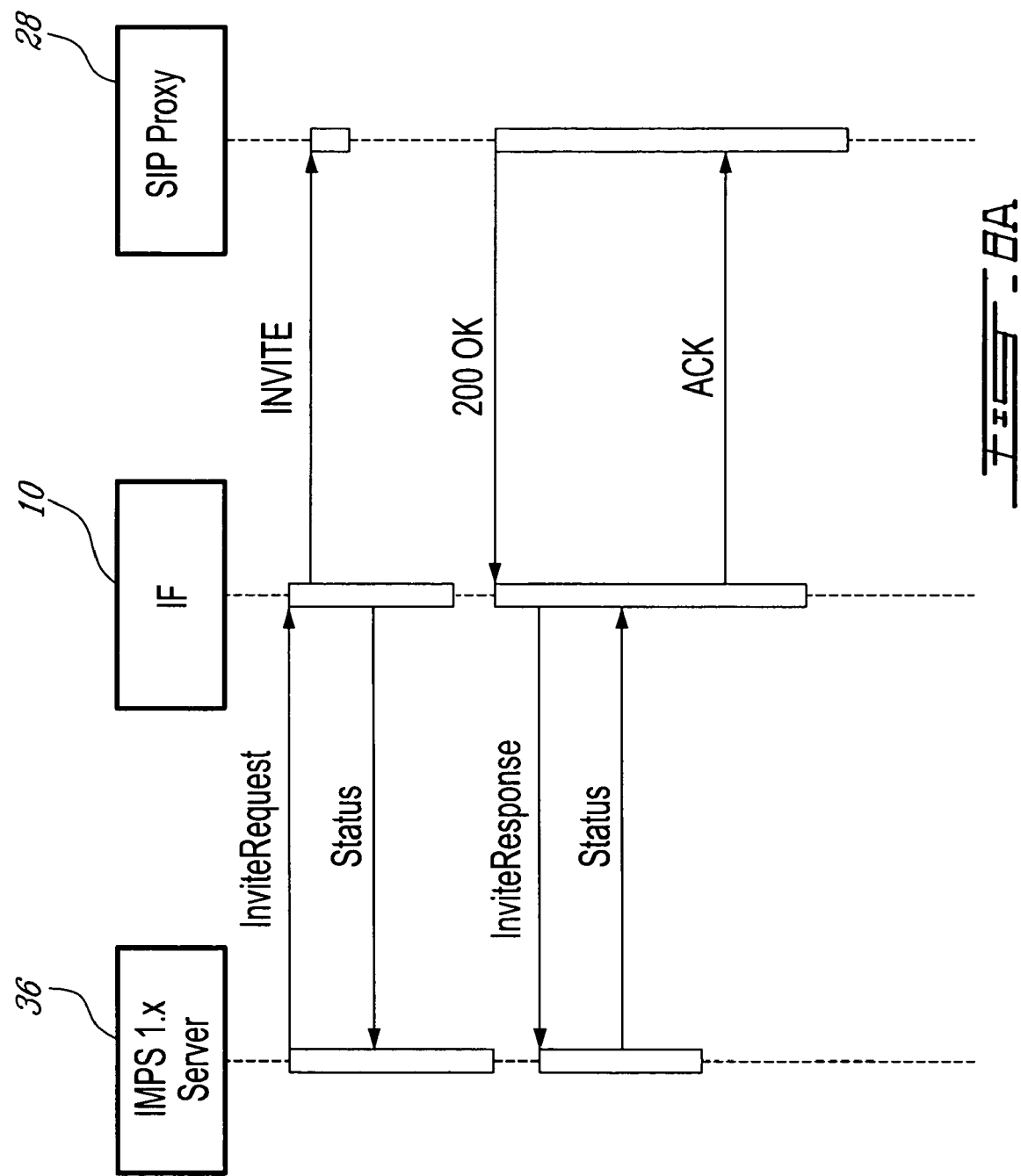
FIGS. 8A and 8B provide diagrams of the transactions for sending invitations between an OMA IMPS and SIMPLE domains in accordance with an illustrative embodiment of the present invention.
Figure 8B:
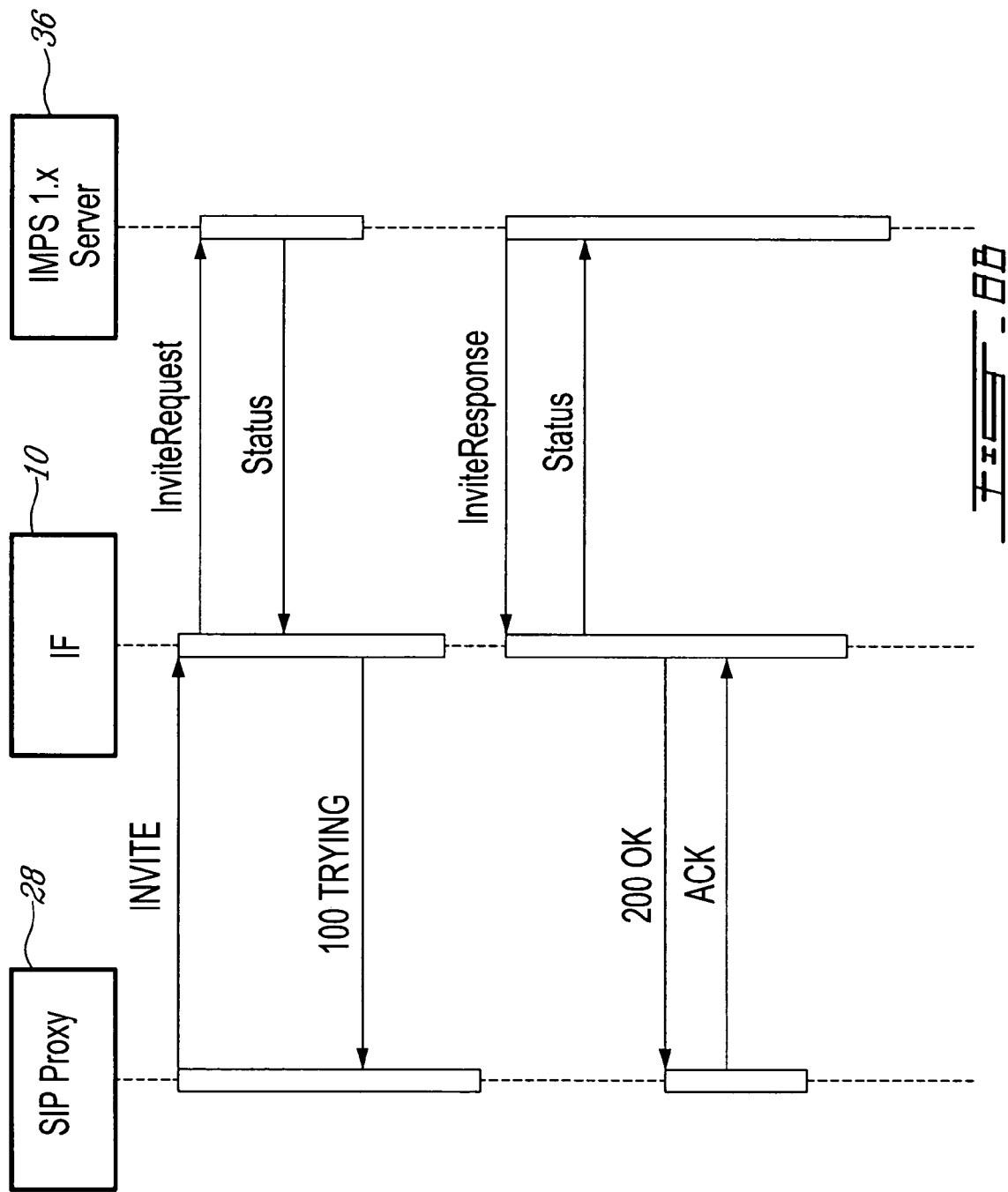

Referring now to FIG. 8A, a Sequence Diagram for an example message flow from initial invitation message sent from a OMA IMPS server 36 is shown. The interworking gateway 10 generates a SIP INVITE request and sends it to the SIP proxy 28 servicing the recipient in the SIMPLE domain. Referring to FIG. 8B, similarly in the reverse direction, an INVITE request is received by the interworking gateway 10 from the SIP proxy 28 and generates an InviteRequest which is relayed to the OMA IMPS server 36. Upon reception of an InviteResponse from the OMA IMPS server 36, a final response is generated and relayed towards the SIP proxy 28.

Presence

As discussed above, the interworking gateway 10 complies to the requirements for a SIP User Agent Server and Client as defined in SIP—Session Initiation Protocol—RFC-3261, the SIP Specific Event Notification extension as defined in Session Initiation Protocol (SIP)—Specific Event Notification—RFC-3265 and the SIP Presence Event Package as defined in a Presence Event Package for Session Initiation Protocol (SIP)—RFC 3856, all are which incorporated herein by reference. It also complies to the Static Conformance Requirements OMA IMPS 1.x SSP Presence Service Element as defined in OMA IMPS 1.2—Server to Server Protocol Static Conformance Requirement v1.2—WV-035.

The operations defined for presence are the same in OMA IMPS domain and the SIMPLE domain:

Subscribe to presence.

Notify subscriber of updated presence.

Poll for presence.

Subscriptions in the SIMPLE domain, however, have an associated time to live whereas the lifetime of OMA IMPS domain subscriptions are related to the lifetime of the related client/server session. The interworking gateway 10 therefore maintains state for subscriptions established from the OMA IMPS domain and periodically before the time to live expires re-subscribes towards the SIMPLE domain to maintain the subscription alive.

Figure 9:
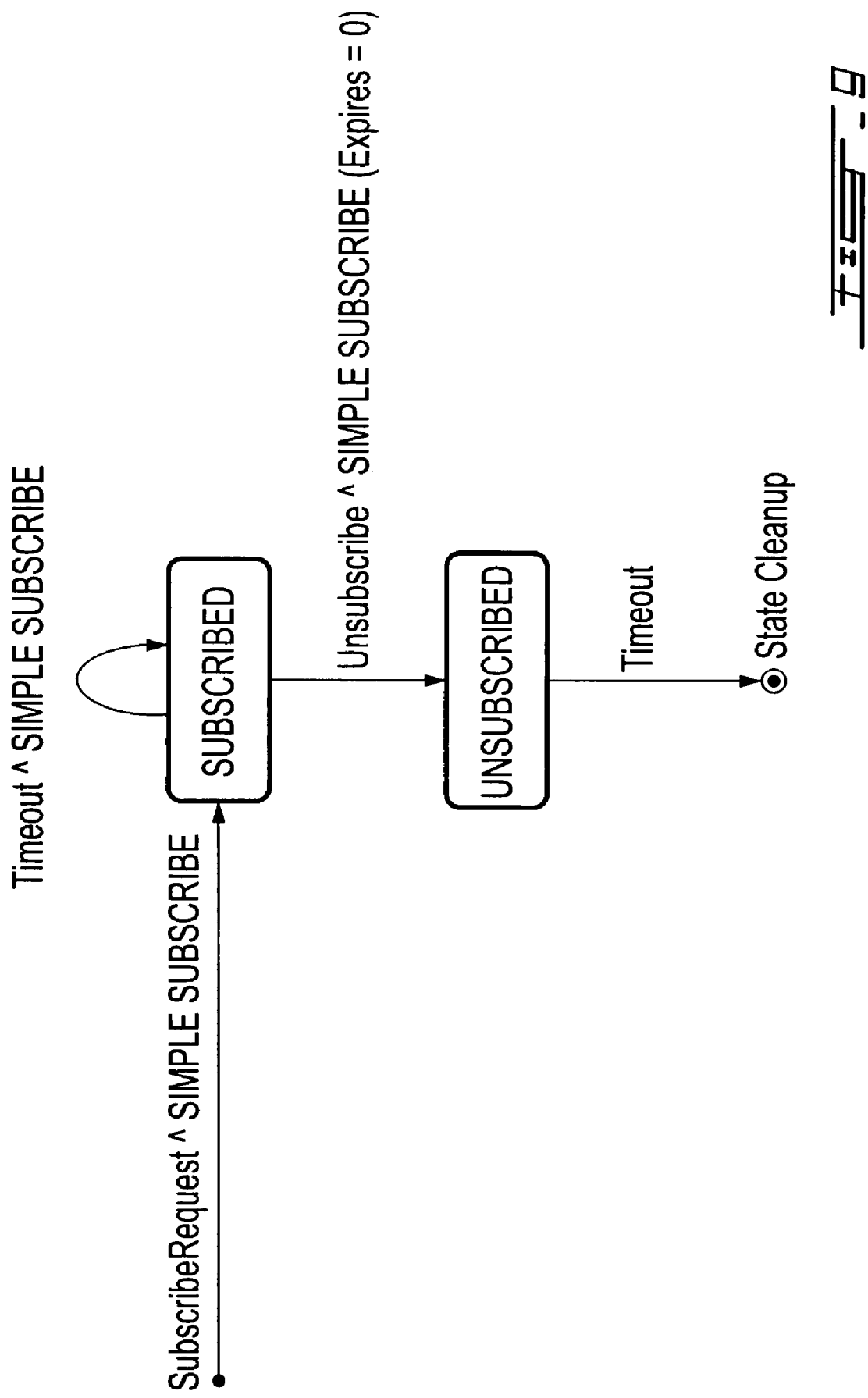
FIG. 9 is a state transition diagram for subscription and unsubscription in accordance with an illustrative embodiment of the present invention.

Referring now to FIG. 9, a State Transition Diagram for maintaining the state of subscriptions is illustrated.

In the SIMPLE domain no such state is needed as re-subscription is handled by the OMA IMPS domain either as a no-op or as an identifiable error response that can be blocked in the interworking gateway 10.

The gateway also maintains state for GetPresenceRequests from the OMA IMPS domain as these are mapped to SUB-SCRIBE in the SIMPLE domain with a time to live of 0. The response will arrive asynchronously as a one off notification which must be mapped to the synchronous GetPresenceResponse in the OMA IMPS domain.

Figure 10:
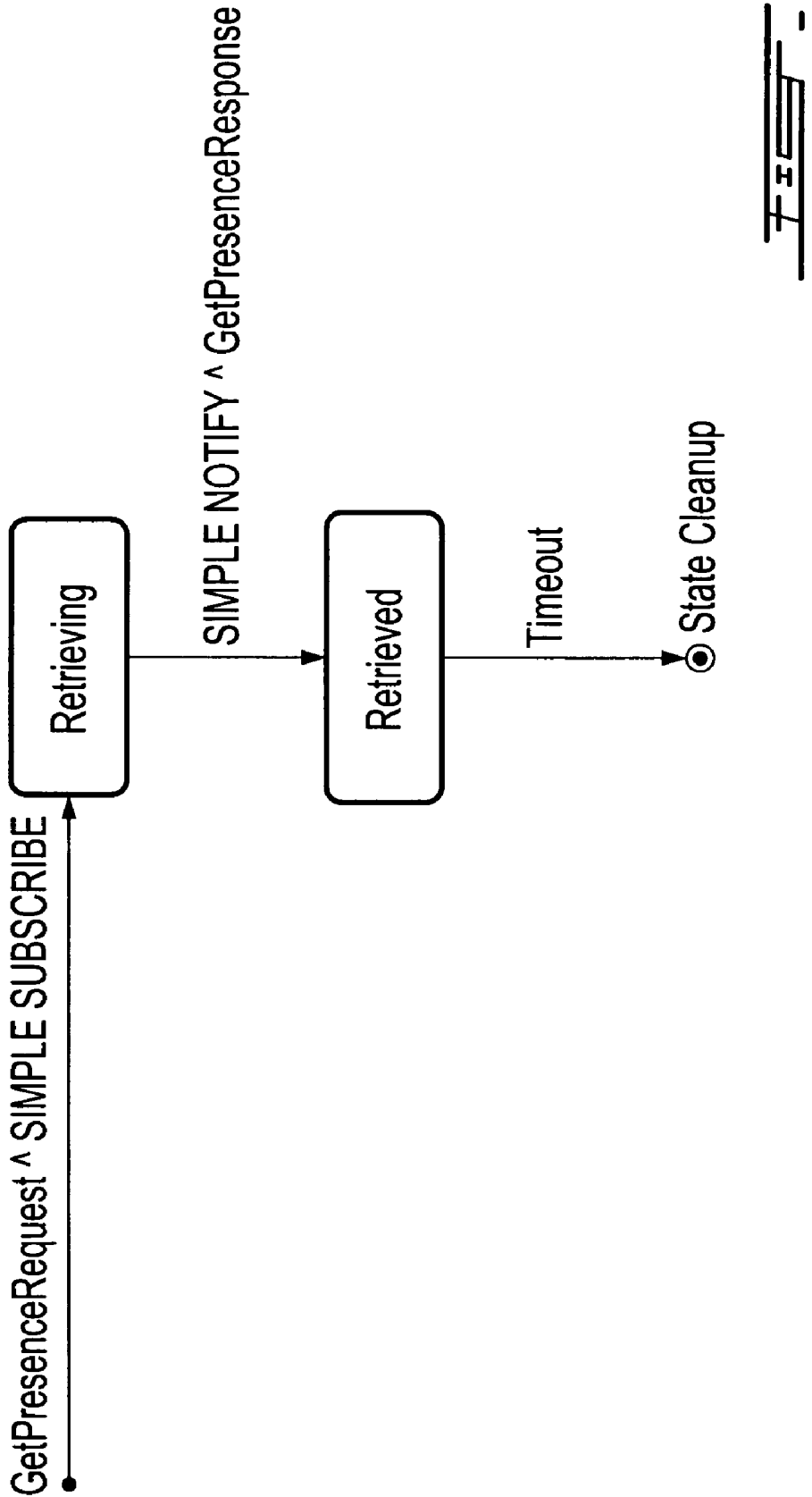
FIG. 10 is a state transition diagram for handling GetPresenceRequests in accordance with an illustrative embodiment of the present invention.

Note that for polling from the SIMPLE domain there is no way to know whether the intention is to unsubscribe an existing subscription or poll based on the message received. Referring to the State Transition Diagram of FIG. 10, the interworking function 10 therefore maintains state and creates two sequential transactions which are relayed towards the OMA IMPS domain: a GetPresenceRequest to poll for presence and a subsequent UnsubscribePresenceRequest.

In transferring presence from the OMA IMPS domain to the SIMPLE domain, the interworking gateway 10 carries out the following mappings:

OMA IMPS SubscribePresenceRequests are mapped to SIMPLE SUBSCRIBEs.

SIMPLE Status responses are mapped to OMA IMPS Status.

OMA IMPS UnsubsribePresenceRequests are mapped to SIMPLE SUBSCRIBEs containing an Expires value equal to zero.

OMA IMPS PresenceNotificationRequest are mapped to SIMPLE NOTIFYs.

OMA IMPS GetPresenceRequests are mapped to SIMPLE SUBSCRIBEs with an Expires value equal to zero.

In transferring presence from the SIMPLE domain to the OMA IMPS domain, the interworking gateway 10 carries out the following mappings:

SIMPLE SUBSCRIBEs are mapped to OMA IMPS SubsribePresenceRequests if Expires header is not equal to zero.

SIMPLE SUBSCRIBEs are mapped to OMA IMPS GetPresenceRequests and a subsequence of OMA IMPS UnsubscribeRequests if the Expires header is equal to zero.

SIMPLE NOTIFYs are mapped to OMA IMPS PresenceNotificationRequest.

Additionally, the interworking gateway 10 reformats the headers containing addresses to comply to the relevant specifications in either the OMA IMPS domain or the SIMPLE domain as necessary.

The interworking gateway 10 supports the presence document content defined in the IMPP Presence Information Document Format (PIDF) as described Presence information Data Format (PDIF)—RFC-3863 which is incorporated herein by reference. It also supports the extensions defined in RPID—Rich Presence Information Data Format—draft-ietf-simple-rpid-00, SIMPLE Presence Document Usage Examples—draft-sparks-simple-pdoc-usage-00, User Agent Capability Presence Status Extension—draft-ietf-simple-prescaps-ext-02 and a Presence-Based GEOPRIV Location Object Format—draft-ietf-geopriv-pidf-lo-03 all of which are incorporated herein by reference. It also supports the OMA IMPS 1.x presence document content defined in OMA IMPS 1.2—Presence Attributes—WV-029 and OMA IMPS 1.2—Presence Attributes DTD and Examples—WV-030, both of which are incorporated herein by reference.

The following is the identified mapping from OMA IMPS presence to SIMPLE presence:

| OMA IMPS Presence | SIMPLE Presence |
| --- | --- |
| OnlineStatus | PIDF: <status><basic> |
| Registration | extension element needed within the <status> element containing information about registration state |
| ClientInfo | as defined in draft-ietf-simple-prescaps-ext-02: <devcaps> |
| TimeZone | PIDF: <timestamp> |
| GeoLocation | draft-ietf-geopriv-pidf-lo-03 using Geographic Markup Language (GML). |
| Address | draft-ietf-geopriv-pidf-lo-03 using GML. |
| Free TextLocation | draft-ietf-geopriv-pidf-lo-03 using GML. |
| PLMN | draft-ietf-geopriv-pidf-lo-03 using GML. |
| CommCap | draft-ietf-simple-prescaps-ext-02: <caps> |
| UserAvailability | RPID: <status><rpid:activity> |
| PreferredContacts | PIDF: <contact> priority |
| PreferredLanguage | draft-ietf-simple-prescaps-ext-02 <caps> |
| Status Text | RPID: <note> |
| StatusMood | RPID: <mode> |
| Alias | CIPIP: <display-name> |
| StatusContent | RPID: <status-icon> |
| ContactInfo | CIPIP: <card> |
| InfoLink | CIPIP: <homepage> |

Note that presence information has not yet been fully defined within the SIMPLE domain. However, in the event that presence information is defined which cannot be mapped to corresponding attributes in OMA IMPS, a person of skill in the art will appreciate that this can be achieved by either:

defining new OMA IMPS presence attributes defining an OMA IMPS presence attribute extension applicable to any OMA IMPS version using the well defined OMA IMPS presence attribute mechanism.

EXAMPLES

Figure 11A:
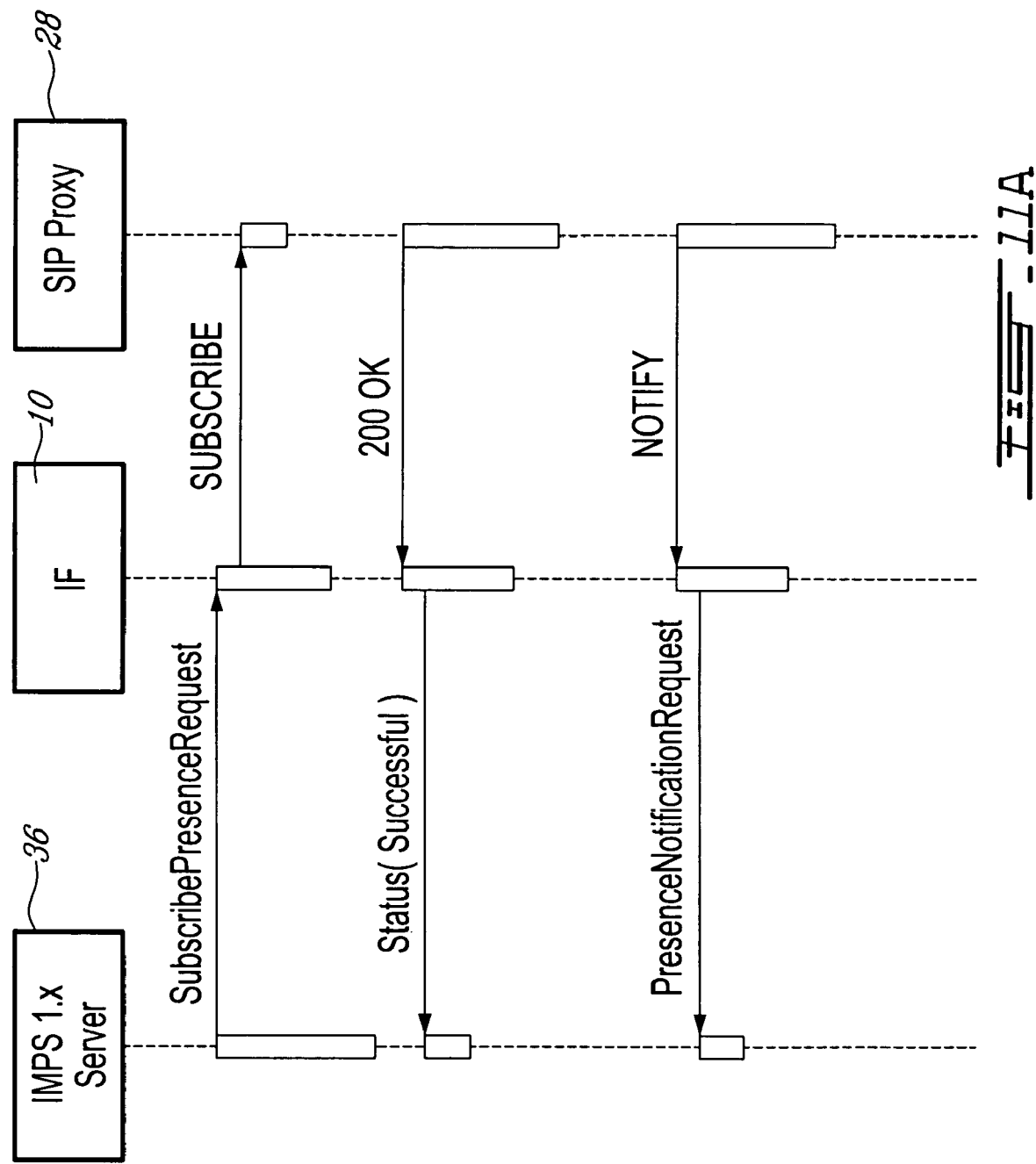

Referring now to FIG. 11A, a Sequence Diagram for an example message flow of a participant in an OMA IMPS domain subscribing to presence information is shown. When a SubscribeRequest message sent from the OMA IMPS domain 36, the interworking function 10 generates a SIP SUBSCRIBE request and sends it to the SIP proxy 28 servicing the recipient. Upon reception of a reply from the SIMPLE domain (in the form of a 200 OK) via the SIP proxy 28, the interworking gateway 10 generates an OMA IMPS Status message detailing the result of the subscription. At a later time, the interworking gateway 10 may receive a NOTIFY request from the SIMPLE domain via the SIP proxy 28. It then maps the PIDF document into an OMA IMPS presence attribute document and sends the document together with a PresenceNotificationRequest to the OMA IMPS domain via the OMA IMPS server 36.

Referring now to FIG. 11B, a Sequence Diagram for an example message flow of a participant in a SIMPLE domain subscribing to presence information is shown. A SUBSCRIBE request is received by the interworking gateway 10 from a participant in the SIMPLE domain via a SIP proxy 28. In response, the interworking gateway 10 generates a SubscribePresenceRequest for transfer to the OMA IMPS domain OMA IMPS server 36. Upon reception of a Status response interworking gateway 10 generates a final response which is relayed to the SIMPLE domain via a SIP proxy 28. At a later time, the interworking gateway 10 may receive a PresenceNotificationRequest from the OMA IMPS domain via the OMA IMPS server 36, upon reception of which the interworking gateway 10 generates a NOTIFY request which is relayed to the SIMPLE domain via the SIP proxy 28.

Referring now to FIG. 12, a Sequence Diagram for the handling by the interworking gateway 10 of a SUBSCRIBE containing an Expires header with value equal to zero request received from a SIP proxy 28 in the SIMPLE domain will be described. In response, the interworking gateway 10 generates a GetPresenceRequest which is relayed to the OMA IMPS domain via a OMA IMPS server 36. Upon reception of a GetPresenceResponse the interworking gateway 10 sends a NOTIFY request to the SIMPLE domain via the SIP proxy 28 and then generates an UnsubsribeRequest which is relayed to the OMA IMPS domain via the OMA IMPS server 36. However, note that in some cases the UnsubscribePresenceRequest message may not be needed as the interworking gateway 10 has no way of knowing whether subscription state has been set up unless it keeps state for all subscriptions.

Group Communication

OMA IMPS 1.x Group Management transactions can be grouped into the following sets of operations:

Manipulation of group properties.

Manipulation of group members.

User joined state.

Subscribe and receive notifications about changes to above data structures.

A similar model is defined for SIMPLE and is based on the concept of a conference policy. The conference policy contains the entire set of properties applicable for the conference. Operations are defined for retrieving and manipulating the conference policy using a Conference Policy Control Protocol (CPCP). Some operations are also implemented using normal SIP methods, such as INVITE and BYE to join and leave a conference.

The interworking gateway 10 maps OMA IMPS group properties operations into to SIMPLE conference policy operations including a mapping between each OMA IMPS group property and its counterpart in the SIMPLE conference policy model when that model has been defined.

In the SIMPLE domain, the interworking gateway 10 acts as a MSRP relay for communication through the group entity. This involves maintaining session state using AUTH and actual message transmission using SEND. The MSRP protocol does not contain information concerning the sender/receiver of messages sent through the MSRP relay and the interworking gateway 10 uses the message/cpim container MIME format as an envelope for all messages. The MSRP session state has an associated time-to-live value for each participant in a group. The interworking gateway 10 periodically sends a keep alive message to the MSRP relay hosting the session on behalf of each participant from the OMA IMPS domain.

EXAMPLE 3

Figure 13A:
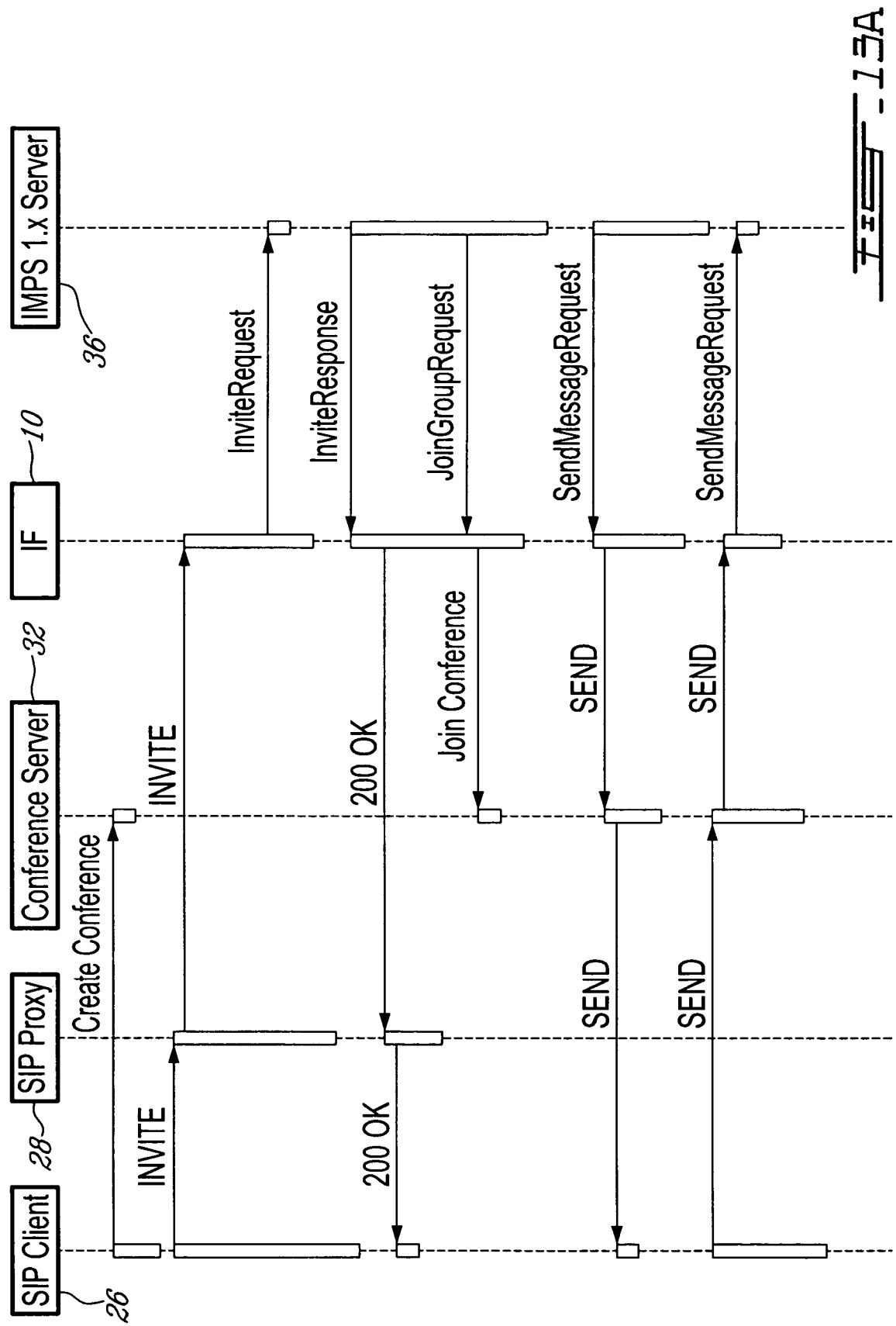
FIGS. 13A and 13B provide diagrams of the transactions for joining conferences and groups between an OMA IMPS and SIMPLE domains in accordance with an illustrative embodiment of the present invention.

Referring now to FIG. 13A, a Sequence Diagram for an example message flow of a client in the SIMPLE domain creating a conference (using a mixture of SIMPLE, SIP and XCON methods) and then sending an INVITE message to the invitee is shown. In response to the INVITE received from the SIP proxy 28, the interworking gateway 10 generates an InviteRequest message which is relayed to the OMA IMPS domain via an OMA IMPS server 36. On receiving an InviteResponse from the OMA IMPS domain via the OMA IMPS server 36, the interworking gateway 10 generates a final response which is relayed to the SIMPLE domain via the SIP proxy 28. The interworking gateway 10 also generates a Join-Conference for transfer to the Conference Server 32 upon reception of a JoinGroupRequest from the OMA IMPS domain (again using a mixture of SIMPLE, SIP and XCON methods, see a Framework for Conferencing with Session Initiation Protocol—draft-ietf-sipping-conferencing-framework-03 which is incorporated herein by reference). At a later time clients in either the OMA IMPS domain or the SIMPLE domain may generate a SendMessageRequest (OMA IMPS) or a MSRP SEND message (SIMPLE).

Figure 13B:
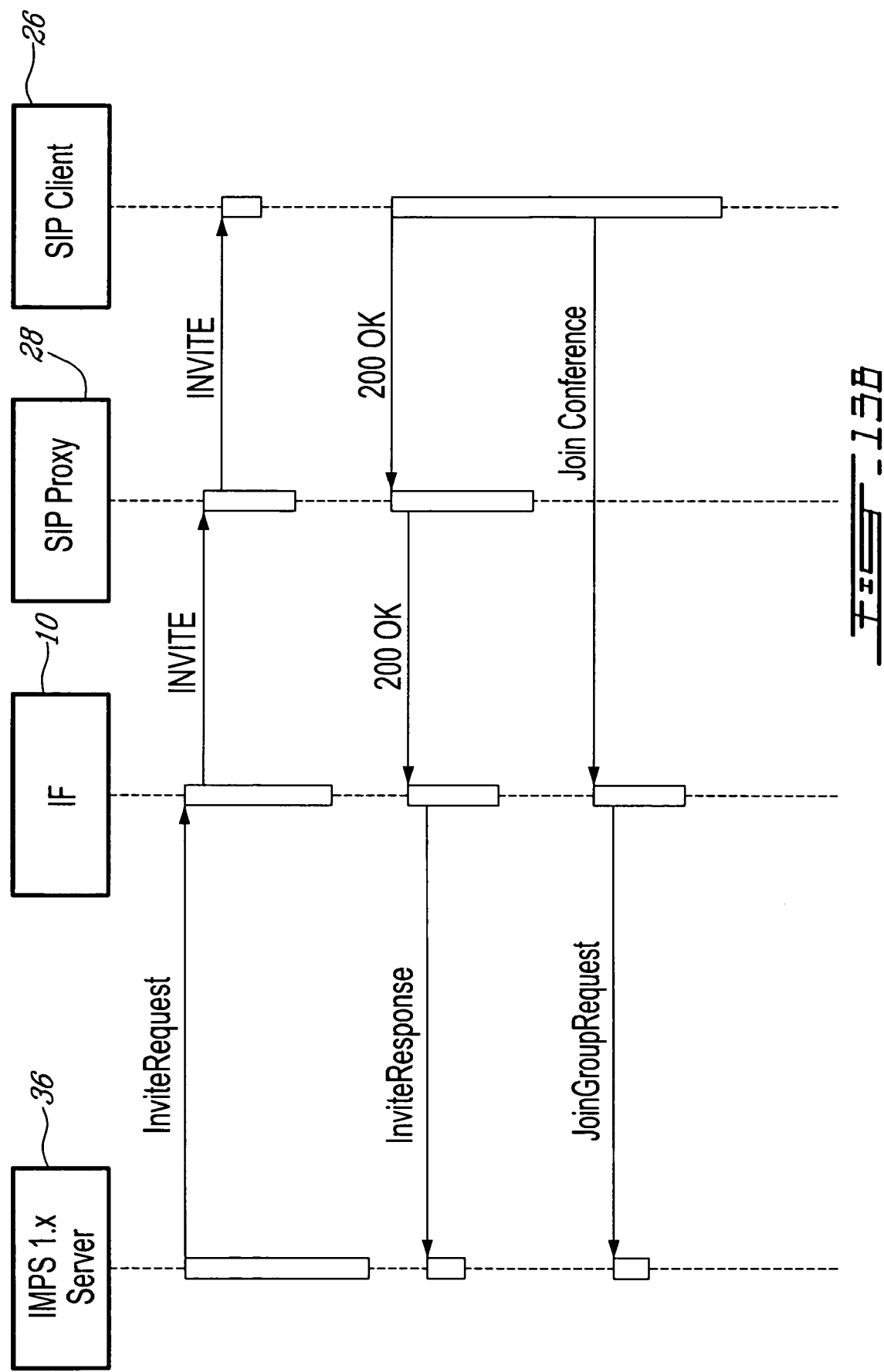

Referring now to FIG. 13B, a Sequence Diagram for an example message flow of a client in the OMA IMPS initiating a conference is shown. The behavior here is similar to that as shown in FIG. 13A. When receiving a Join Conference request from the SIP Client 26, the interworking gateway 10 generates a JoinGroupRequest message which is relayed to the OMA IMPS domain via the OMA IMPS Server 36.

Figure 14:
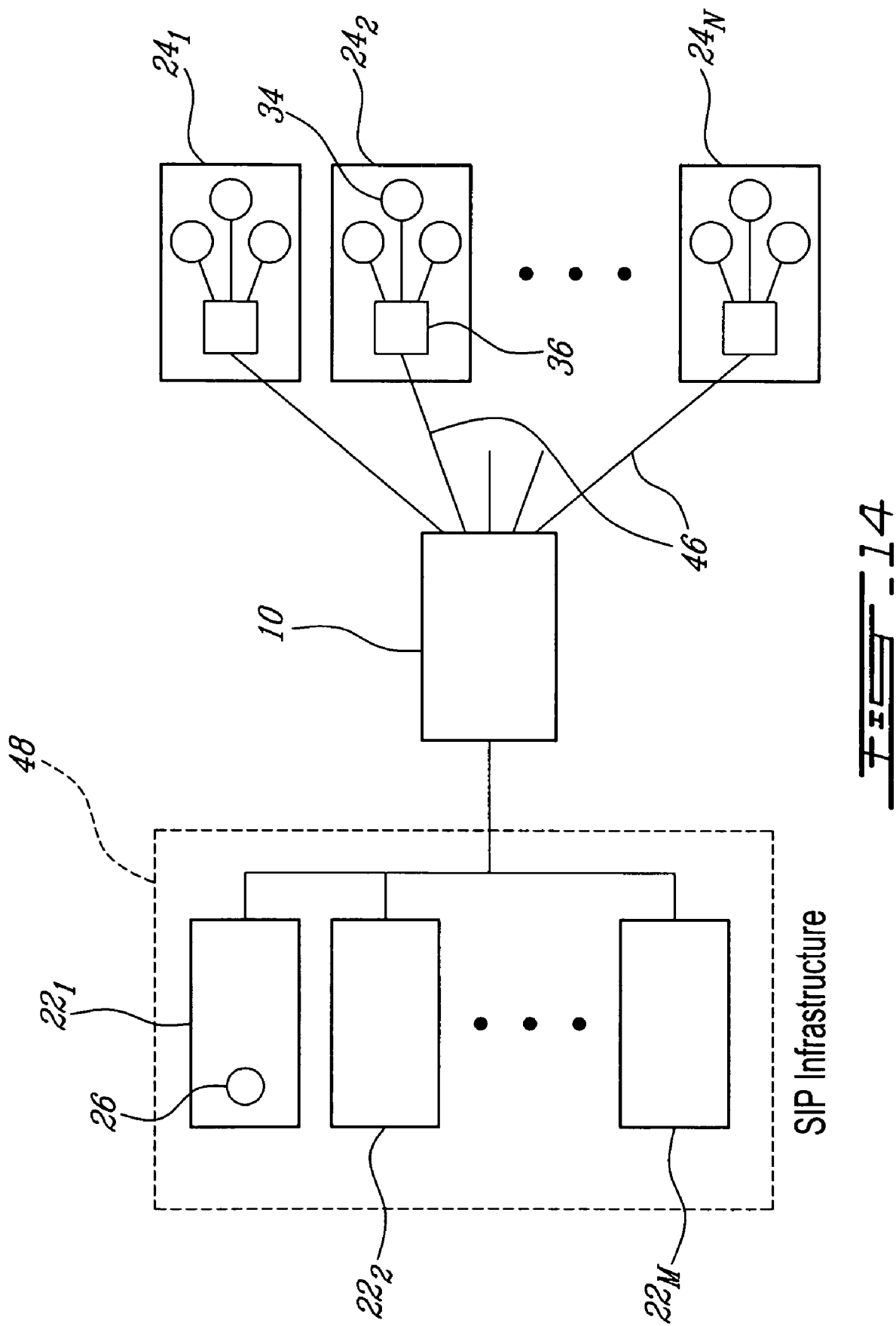
FIG. 14 is a schematic diagram of an interworking gateway interworking with multiple OMA IMPS and SIMPLE domains in accordance with an alternative illustrative embodiment of the present invention.

Referring back to FIG. 5, in its basic form, the interworking gateway 10 enables a single OMA IMPS domain 24 to interwork with a single SIMPLE domain 22. However, referring to FIG. 14, the scope of the interworking gateway 10 can be expanded to enable multiple OMA IMPS domains as in $24_1$, $24_2, \ldots, 24_N$ to interwork with multiple SIMPLE domains as in $22_1, 22_2, \ldots, 22_M$. Additionally, the interworking gateway 10 can also be used to interconnect the multiple OMA IMPS domains as in $24_1, 24_2, \ldots, 24_N$. In this regard, each OMA IMPS domain as in $24_1, 24_2, \ldots, 24_N$ is interconnected with the interworking gateway 10 via an OMA IMPS server as in 36 and at least one SSP connection as in 46. In turn, the OMA IMPS servers as in 36 service a number of clients as in 34.

The manner of operation will be described using an example. A request originates, for example, from a SIP client 26 in a first SIMPLE Domain $22_1$. If the destination of the request is a SIP client (not shown) in another SIMPLE domain, for example one of SIMPLE domain $22_2$ to SIMPLE Domain $22_M$, the request is routed directly to the destination SIMPLE domain by the SIP Infrastructure 48. In this regard, routing across SIMPLE domains is a service provided by the SIP infrastructure 48. In this case, the interworking gateway 10 is not involved. However, if the destination of the request is an OMA IMPS client 34, the SIP infrastructure routes the request to the interworking gateway 10 for transfer to the OMA IMPS client 34. This is accomplished by the SIP infrastructure 48 in the same manner as for routing to other SIMPLE domains. The interworking gateway 10 appears to the SIP infrastructure 48 as a server serving the SIMPLE domain associated with the destination of the message. The SIP infrastructure 48 retrieves the SIMPLE domain serving the destination from the identity of the destination. When the destination is an OMA IMPS client, this identity points to a SIMPLE domain associated with the interworking gateway 10.

At the interworking gateway 10, the address of the destination OMA IMPS client 34 identified in the incoming SIP request is mapped into its OMA IMPS UserID by the interworking gateway 10 (see the discussion hereinabove under "Routing and Addressing"). The OMA IMPS UserID identifies the OMA IMPS domain $24_1, 24_2, \ldots, 24_N$ serving the destination OMA IMPS client 34. The interworking gateway 10 retrieves this serving OMA IMPS domain from entries in the routing table (as discussed hereinabove) as the OMA IMPS domain which corresponds to the OMA IMPS UserID. The interworking gateway 10 performs any transaction mapping (also as described hereinabove) required for the request. Following these mappings (or conversions), the interworking gateway 10 then relays the mapped request to the serving OMA IMPS domain $24_1, 24_2, \ldots, 24_N$ by transmitting the request via an SSP connection associated with that particular OMA IMPS domain.

In the case of a request originating from, for example, an OMA IMPS client 34 in OMA IMPS domain $24_2$ and destined for another OMA IMPS client in a different OMA IMPS domain, the request is first relayed to the interworking gateway 10 via an SSP connection as in 46. The interworking gateway 10 identifies the serving OMA IMPS domain of the OMA IMPS client identified by the destination OMA IMPS UserID contained within the request. As the serving OMA IMPS domain of the OMA IMPS client identified by the destination OMA IMPS UserID is another OMA IMPS domain, the interworking gateway 10 relays the request to the serving OMA IMPS domain over the SSP connection as in 46 associated with the serving OMA IMPS domain. It will be apparent now to a person of ordinary skill in the art that in such a case the interworking gateway 10 carries out no protocol conversion (as the domains of the originator and the destination are both OMA IMPS domains). On the other hand, for requests originating at an OMA IMPS client 34 within an OMA IMPS domain 36 and destined for a SIP client 26 in a SIMPLE domain as in 22, the request are first relayed to the interworking gateway 10 via an SSP connection as in 46. As the domain servicing the destination SIP client 26 is a SIMPLE domain as in 22, the interworking gateway 10 performs transaction mapping on the request to convert it from an OMA IMPS transaction to SIMPLE transaction (as discussed hereinabove under "Transaction Mapping"). The interworking gateway 10 then relays the request via the SIMPLE interface (reference 38 in FIG. 5) to the SIP Infrastructure 48 following which the SIP Infrastructure 48 routes the message to the specific SIMPLE domain as in $22_1, 22_2, \ldots, 22_M$ serving the destination SIMPLE client 26.

Note that the SSP protocol currently requires a connection to be established between any two interconnected OMA IMPS domains. As a result, interconnecting together N OMA IMPS domains with direct SSP connections require a total number of $N*(N-1)/2$ connections. As the number of OMA IMPS domains increases, the total number of connections thus grows exponentially (as a square of the number of OMA IMPS domains). One advantage of interposing the interworking gateway 10, therefore, is that it allows each OMA IMPS domain to be interconnected with a plurality of other OMA IMPS domains with provision of a single SSP connection between each of the OMA IMPS domains and the interworking gateway 10, which in turn reduces the number of SSP interconnections required to provide total interconnectivity. As a result, as the number of interconnected OMA IMPS domains grows large, the related management burden is significantly reduced vis-à-vis an implementation where direct SSP connections between OMA IMPS domains is used.

Although the present invention has been described hereinabove by way of an illustrative embodiment thereof, this embodiment can be modified at will without departing from the spirit and nature of the subject invention.

We claim:

1. An interworking gateway for interworking at least one Open Mobile Alliance (OMA) Instant Message and Presence Service (IMPS) domain and a Session Initiation Protocol (SIP) infrastructure comprising at least one SIP Instant Messaging and Presence Leveraging Extensions (SIMPLE) domain, the gateway comprising:
    an OMA IMPS interface for communication with the at least one OMA IMPS domain;
    a SIMPLE interface for communication with the SIP infrastructure; and
    an interworking function linking said interfaces and comprising a transaction mapping module for converting an interworking subset of OMA IMPS transactions received by said OMA IMPS interface to corresponding SIMPLE transactions and relaying said corresponding SIMPLE transactions to said SIMPLE interface for transfer to the SIP infrastructure, and for mapping an interworking subset of SIMPLE transactions received by said SIMPLE interface to corresponding OMA IMPS transactions and relaying said corresponding OMA IMPS transactions to said OMA IMPS interface for transfer to the at least one OMA IMPS domain.

2. The interworking gateway of claim 1, wherein the OMA IMPS interface communicates with each OMA IMPS domain using OMA IMPS SSP.

3. The interworking gateway of claim 1, wherein the SIMPLE interface communicates with the SIP infrastructure using MSRP, CPCP and SIP.

4. The interworking gateway of claim 2, wherein the OMA IMPS interface comprises a protocol stack comprising an OMA IMPS SSP layer, a HTTP layer and a TCP/IP layer.

5. The interworking gateway of claim 2, wherein said SIMPLE interface comprises a protocol stack comprising a SIP layer, a HTTP layer, a TCP/IP layer and a UDP/IP layer.

6. The interworking gateway of claim 1, wherein each OMA IMPS domain comprises at least one OMA IMPS client and each SIMPLE domain comprises at least one SIP client, the OMA IMPS client exchanging instant messages with the SIP client via an OMA IMPS server and a SIP proxy, and wherein said OMA IMPS interface is in communication with said OMA IMPS server and said SIMPLE interface is in communication with said SIP proxy.

7. The interworking gateway of claim 1, wherein said OMA IMPS interface further comprises a routing table comprising an identifier of said at least OMA IMPS client coupled with an identifier of an OMA IMPS server servicing said at least one OMA IMPS client and wherein said OMA IMPS interface routes received OMA IMPS transactions comprising a particular destination address to an OMA IMPS server which services an OMA IMPS client designated by said destination address.

8. The interworking gateway of claim 7, wherein said received OMA IMPS transactions comprise corresponding OMA IMPS transactions received from said mapping module and OMA IMPS transactions received at said OMA IMPS interface from an OMA IMPS server.

9. The interworking gateway of claim 7, wherein each of said corresponding OMA IMPS transactions comprises a destination OMA IMPS client address and said OMA IMPS client identifier is an OMA IMPS client address.

10. The interworking gateway of claim 1, wherein said transaction mapping module converts OMA IMPS domain addresses to SIMPLE domain addresses and SIMPLE domain addresses to OMA IMPS domain addresses.

11. A method for interworking at least one Open Mobile Alliance (OMA) Instant Message and Presence Service (IMPS) domain and a Session Initiation Protocol (SIP) infrastructure comprising at least one SIP Instant Messaging and Presence Leveraging Extensions (SIMPLE) domain, the method comprising the steps of:
- receiving OMA IMPS transactions from users in an OMA IMPS domain over an OMA IMPS interface;
- receiving SIMPLE transactions from users in a SIMPLE domain over a SIMPLE interface;
- converting an interworking subset of said OMA IMPS transactions received by said OMA IMPS interface to corresponding SIMPLE transactions and relaying said corresponding SIMPLE transactions to said SIMPLE interface for transfer to the SIMPLE domain; and
- converting an interworking subset of said SIMPLE transactions received by said SIMPLE interface to corresponding OMA IMPS transactions and relaying said corresponding OMA IMPS transactions to said OMA IMPS interface for transfer to the OMA IMPS domain.

12. The method of claim 11, wherein the OMA IMPS interface communicates with each OMA IMPS domain using OMA IMPS SSP.

13. The method of claim 11, wherein the SIMPLE interface communicates with the SIP infrastructure using MSRP, CPCP and SIP.

14. The method of claim 12, wherein the OMA IMPS interface comprises a protocol stack comprising an OMA IMPS SSP layer, a HTTP layer and a TCP/IP layer.

15. The method of claim 13, wherein said SIMPLE interface comprises a protocol stack comprising a SIP layer, a HTTP layer, a TCP/IP layer and a UDP/IP layer.

16. The method of claim 11, wherein each OMA IMPS domain comprises at least one OMA IMPS client and the SIMPLE domain comprises at least one SIP client, the OMA IMPS client exchanging instant messages with the SIP client via an OMA IMPS server and a SIP proxy, and wherein said OMA IMPS interface is in communication with said OMA IMPS server and said SIMPLE interface is in communication with said SIP proxy.

17. The method of claim 11, wherein said OMA IMPS interface further comprises a routing table comprising an identifier of said at least OMA IMPS client coupled with an identifier of an OMA IMPS server servicing said at least one OMA IMPS client and wherein said OMA IMPS interface routes OMA IMPS transactions comprising an OMA IMPS destination address to an OMA IMPS server which services an OMA IMPS client designated by said OMA IMPS destination address.

18. The method of claim 17, wherein said received OMA IMPS transactions comprise corresponding OMA IMPS transactions received from said mapping module and OMA IMPS transactions received at said OMA IMPS interface from an OMA IMPS server.

19. The method of claim 17, wherein a particular one of said corresponding OMA IMPS transactions is destined for a destination OMA IMPS client, and wherein said OMA IMPS interface routes said particular transaction to an OMA IMPS server which services said destination OMA IMPS client.

20. The method of claim 17, wherein each of said corresponding OMA IMPS transactions comprises a destination OMA IMPS client address and said OMA IMPS client identifier is an OMA IMPS client address.

21. The method of claim 11, wherein said transaction mapping module converts OMA IMPS domain addresses to SIMPLE domain addresses and SIMPLE domain addresses to OMA IMPS domain addresses.

* * * * *